(12) United States Patent
Kobayashi et al.

(10) Patent No.: US 11,398,352 B2
(45) Date of Patent: Jul. 26, 2022

(54) CAPACITOR COMPONENT

(71) Applicant: Murata Manufacturing Co., Ltd., Nagaokakyo (JP)

(72) Inventors: Yuji Kobayashi, Nagaokakyo (JP); Tomohiro Sasaki, Nagaokakyo (JP); Yuichiro Tanaka, Nagaokakyo (JP); Daisuke Oyama, Nagaokakyo (JP); Satoshi Ishitobi, Nagaokakyo (JP)

(73) Assignee: MURATA MANUFACTURING CO., LTD, Kyoto (JP)

( * ) Notice: Subject to any disclaimer, the term of this patent is extended or adjusted under 35 U.S.C. 154(b) by 7 days.

(21) Appl. No.: 16/926,925

(22) Filed: Jul. 13, 2020

(65) Prior Publication Data
US 2021/0027949 A1    Jan. 28, 2021

(30) Foreign Application Priority Data
Jul. 24, 2019   (JP) ............................. JP2019-136181

(51) Int. Cl.
*H01G 4/30* (2006.01)
*H01G 4/012* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ............ H01G 4/12; H01G 2/065; H01G 2/24; H01G 4/0085; H01G 4/012; H01G 4/20;
(Continued)

(56) References Cited

U.S. PATENT DOCUMENTS

| 2006/0158825 A1* | 7/2006 | Hidaka | ................. H01G 4/012 361/303 |
| 2009/0015986 A1* | 1/2009 | Togashi | ................. H01G 4/232 361/321.4 |

(Continued)

FOREIGN PATENT DOCUMENTS

| JP | 06-151244 A | 5/1994 |
| JP | 2002-111310 A | 4/2002 |

(Continued)

*Primary Examiner* — Michael P McFadden
(74) *Attorney, Agent, or Firm* — Keating & Bennett, LLP

(57) ABSTRACT

A capacitor component includes a laminate including dielectric layers and internal electrode layers, first and second external electrodes respectively provided on first and second end surfaces of the laminate, and a third external electrode provided on at least one of first and second lateral surfaces of the laminate. The internal electrode layers include a first internal electrode layer connected to the first external electrode and not connected to either the second or the third external electrode; a second internal electrode layer connected to the second external electrode and not connected to either the first or the third external electrode; a third internal electrode layer not connected to any of the first, the second, or the third external electrode; and a fourth internal electrode layer connected to the third external electrode and not connected to either the first or the second external electrode.

17 Claims, 13 Drawing Sheets

(51) Int. Cl.
*H01G 2/06* (2006.01)
*H01G 4/12* (2006.01)
*H01G 4/008* (2006.01)

(58) Field of Classification Search
CPC ........ H01G 4/2325; H01G 4/30; H01G 4/306;
H01G 4/33; H01G 4/008; H01G 4/1218
See application file for complete search history.

(56) References Cited

U.S. PATENT DOCUMENTS

| | | | | |
|---|---|---|---|---|
| 2012/0319537 | A1* | 12/2012 | Sakuratani | ............ H01L 41/273 |
| | | | | 310/366 |
| 2014/0293500 | A1* | 10/2014 | Seo | ........................... H01G 4/30 |
| | | | | 361/301.4 |
| 2016/0099107 | A1* | 4/2016 | Lee | ......................... H01G 2/065 |
| | | | | 174/260 |
| 2016/0111216 | A1* | 4/2016 | Lee | ......................... H01G 4/012 |
| | | | | 361/301.4 |
| 2018/0226191 | A1* | 8/2018 | Yoshida | ................... H01G 4/30 |

FOREIGN PATENT DOCUMENTS

| | | |
|---|---|---|
| JP | 2010-098052 A | 4/2010 |
| JP | 2015-041735 A | 3/2015 |

\* cited by examiner

FIG.12

| | LT cross section | LW cross section 1 | LW cross section 2 |
|---|---|---|---|
| Example 1 | | | |
| Example 2 | | | |
| Reference Example 1 | | | |
| Comparative Example 1 | | | |

CAPACITOR COMPONENT

CROSS REFERENCE TO RELATED APPLICATIONS

This application claims the benefit of priority to Japanese Patent Application No. 2019-136181 filed on Jul. 24, 2019. The entire contents of this application are hereby incorporated herein by reference.

BACKGROUND OF THE INVENTION

1. Field of the Invention

The present invention relates to capacitor components, for example, multilayer ceramic capacitors.

2. Description of the Related Art

Conventionally, capacitor components have been provided as electronic components to remove noise superimposed on an electronic circuit. This type of capacitor components is called a bypass capacitor or a decoupling capacitor, and is provided to an electric circuit to connect a power line to the ground (a ground line).

For example, a DC/DC converter mounted on electronic equipment converts a DC voltage to a predetermined DC voltage suitable for electronic devices and supplies the DC voltage as power. A capacitor component, for example, a multilayer ceramic capacitor, is connected to an I/O circuit of the DC/DC converter in order to reduce noise generated from switching operations.

JP 2015-41735 A discloses a capacitor component including a laminate having a substantially cuboid shape and including dielectric layers and internal electrode layers alternately laminated in a first direction; a first external electrode and a second external electrode respectively on one and the other of first lateral surfaces of the laminate, the lateral surfaces in a pair opposing each other in a second direction perpendicular to the first direction; and a third external electrode on at least one of second lateral surfaces of the laminate, the second lateral surfaces in a pair opposing each other in a third direction perpendicular to the first direction and the second direction. The internal electrode layers include a first internal electrode layer connected to the first external electrode and the second external electrode and not connected to the third external electrode, a second internal electrode layer not connected to any of the first external electrode, the second external electrode, or the third external electrode, and a third internal electrode layer connected to the third external electrode and not connected to either the first external electrode or the second external electrode. The first internal electrode layer opposes the second internal electrode layer in the first direction to define a first capacitor element, and the second internal electrode layer opposes the third internal electrode layer in the first direction to define a second capacitor element. Thus, the first capacitor element and the second capacitor element are electrically connected in series among the first external electrode, the second external electrode, and the third external electrode.

FIG. 14 is a WT cross-sectional view showing an example of a multilayer ceramic capacitor including a capacitor component disclosed in JP 2015-41735 A. FIG. 15 is an LT cross-sectional view taken along line C-C of the multilayer ceramic capacitor shown in FIG. 14. FIG. 16A is an LW cross-sectional view of a portion including a signal internal electrode layer and grounding internal electrode layers of the multilayer ceramic capacitor shown in FIG. 14 and FIG. 15. FIG. 16B is another LW cross-sectional view of a portion including a floating internal electrode layer of the multilayer ceramic capacitor shown in FIG. 14 and FIG. 15.

A multilayer ceramic capacitor 100 shown in FIG. 14 and FIG. 15 includes a laminate 110, a first signal external electrode 116 as a first external electrode, a second signal external electrode 117 as a second external electrode, and a pair of grounding external electrode 118 and 119 as third external electrodes.

The laminate 110 has a substantially cuboid shape, and includes a pair of main surfaces 110a and 110b opposing each other in a Z-axis direction shown in the figures (first direction), a pair of first lateral surfaces (also referred to as "end surfaces") 110c and 110d opposing each other in an X-axis direction shown in the figures (second direction perpendicular to the first direction), and a pair of second lateral surfaces (also referred to as "lateral surfaces") 110e and 110f opposing each other in a Y-axis direction shown in the figures (third direction perpendicular to the first and the second directions).

As shown in FIG. 14 and FIG. 15, the laminate 110 includes dielectric layers 111 and internal electrode layers 112, 113, 114A, and 114B alternately laminated in the first direction (i.e., Z-axis direction). The internal electrode layers 112, 113, 114A, and 114B inside the laminate 110 are provided as multiple layers separated by the dielectric layers 111.

The internal electrode layers 112, 113, 114A, and 114B include the signal internal electrode layer 112 as a first internal electrode layer, the floating internal electrode layer 113 as a second internal electrode layer, and the pair of grounding internal electrode layers 114A and 114B as third internal electrode layers.

As shown in FIG. 16A, the signal internal electrode layer 112 and the pair of grounding internal electrode layers 114A and 114B are aligned on a single plane perpendicular to the lamination direction (i.e., Z-axis direction). Thus, the signal internal electrode layer 112 and the pair of grounding internal electrode layers 114A and 114B are arranged in the same plane that is a first plane.

As shown in FIG. 16B, the floating internal electrode layer 113 is arranged in a second plane different from the first plane where the signal internal electrode layer 112 and the pair of grounding internal electrode layers 114A and 114B are disposed. The floating internal electrode layer 113 opposes each of the signal internal electrode layer 112 and the pair of grounding internal electrode layers 114A and 114B. Thus, when viewed in the lamination direction (Z-axis direction), the signal internal electrode layer 112 overlaps a portion of the floating internal electrode layer 113, and the grounding internal electrode layers 114A and 114B each overlap another portion of the floating internal electrode layer 113.

With the above features, as shown in FIG. 14, the signal internal electrode layer 112 opposes the floating internal electrode layer 113 to define a first capacitor element 120A, and the floating internal electrode layer 113 opposes the grounding internal electrode layers 114A and 114B to define second capacitor elements 120B. Further, the first capacitor element 120A and the second capacitor elements 120B are electrically connected in series via the floating internal electrode layer 113.

When the first capacitor element 120A and the second capacitor elements 120B are electrically connected in series, electrical insulation is maintained by one type of the capacitor elements in the event of dielectric breakdown in the other type of the capacitor elements, thus providing a high reliability. Further, the first capacitor element 120A and the second capacitor elements 120B are adjacent to the signal internal electrode layer 112 connected to the first signal external electrode 116 and the second signal external electrode 117, and extra wiring is able to be substantially eliminated and thus equivalent series inductance (ESL) is able to be significantly reduced.

When the multilayer ceramic capacitor 100 is viewed in the lamination direction (Z-axis direction), however, the effective portion of the first capacitor element 120A (i.e., an overlapping portion between the signal internal electrode layer 112 and the floating internal electrode layer 113) and the effective portion of the second capacitor element 120B (i.e., an overlapping portion between the grounding internal electrode layer 114A or 114B and the floating internal electrode layer 113) each overlap the first signal external electrode 116 or the second signal external electrode 117 (see FIGS. 16A and 16B). Thus, when warping cracking occurs at the ends of these external electrodes, the capacitor elements connected in series may break down simultaneously, failing to provide the effect described above. The term "warping cracking" means cracking that occurs in a laminate defining a capacitor component such as a multilayer ceramic capacitor, due to warping of a mounting board while the capacitor component is mounted on the mounting board.

SUMMARY OF THE INVENTION

Preferred embodiments of the present invention provide capacitor components in each of which capacitor elements connected in series are prevented from breaking simultaneously when warping cracking occurs at an end of an external electrode.

A capacitor component according to a preferred embodiment of the present invention includes a laminate including dielectric layers and internal electrode layers alternately laminated in a first direction; a first external electrode and a second external electrode respectively provided on a first end surface and a second end surface of the laminate, the first and second end surfaces provided as a pair opposing each other in a second direction perpendicular or substantially perpendicular to the first direction; and a third external electrode provided on at least one of a first lateral surface and a second lateral surface of the laminate, the first and second lateral surfaces provided as a pair opposing each other in a third direction perpendicular or substantially perpendicular to the first direction and the second direction. The internal electrode layers include a first internal electrode layer connected to the first external electrode and not connected to either the second external electrode or the third external electrode; a second internal electrode layer connected to the second external electrode and not connected to either the first external electrode or the third external electrode; a third internal electrode layer not connected to any of the first external electrode, the second external electrode, or the third external electrode; and a fourth internal electrode layer connected to the third external electrode and not connected to either the first external electrode or the second external electrode. The first internal electrode layer or the second internal electrode layer opposes the third internal electrode layer in the first direction to define a first capacitor element, the third internal electrode layer opposes the fourth internal electrode layer in the first direction to define a second capacitor element, and the first capacitor element and the second capacitor element are electrically connected in series among the first external electrode, the second external electrode, and the third external electrode.

Preferred embodiments of the present invention provide capacitor components in each of which capacitor elements connected in series are prevented from breaking simultaneously when warping cracking occurs at an end of an external electrode.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a set of LT cross-sectional views and LW cross-sectional views of laminates defining multilayer ceramic capacitors in Example 1, Example 2, Reference Example 1, and Comparative Example 1.

DETAILED DESCRIPTION OF THE PREFERRED EMBODIMENTS

Capacitor components according to preferred embodiments of the present invention are described below with reference to the drawings.

The present invention is not limited to the following preferred embodiments, and may be suitably modified without departing from the gist of the present invention. Combinations of two or more preferred features described in the following preferred embodiments are also within the scope of the present invention.

The following preferred embodiments are examples, and features of different preferred embodiments are able to be partially exchanged or combined with each other. In the second preferred embodiment and subsequent preferred embodiments, a description of features common to the first preferred embodiment is omitted, and only different points are described. In particular, similar advantageous effects provided by similar features are not described in each preferred embodiment.

Examples of capacitor components according to preferred embodiments of the present invention include multilayer ceramic capacitors that include a ceramic material as a dielectric material and multilayer metallized film capacitors that include a resin film as a dielectric material. In the following preferred embodiments, a multilayer ceramic capacitor is described as an example.

First Preferred Embodiment

Figure 1:
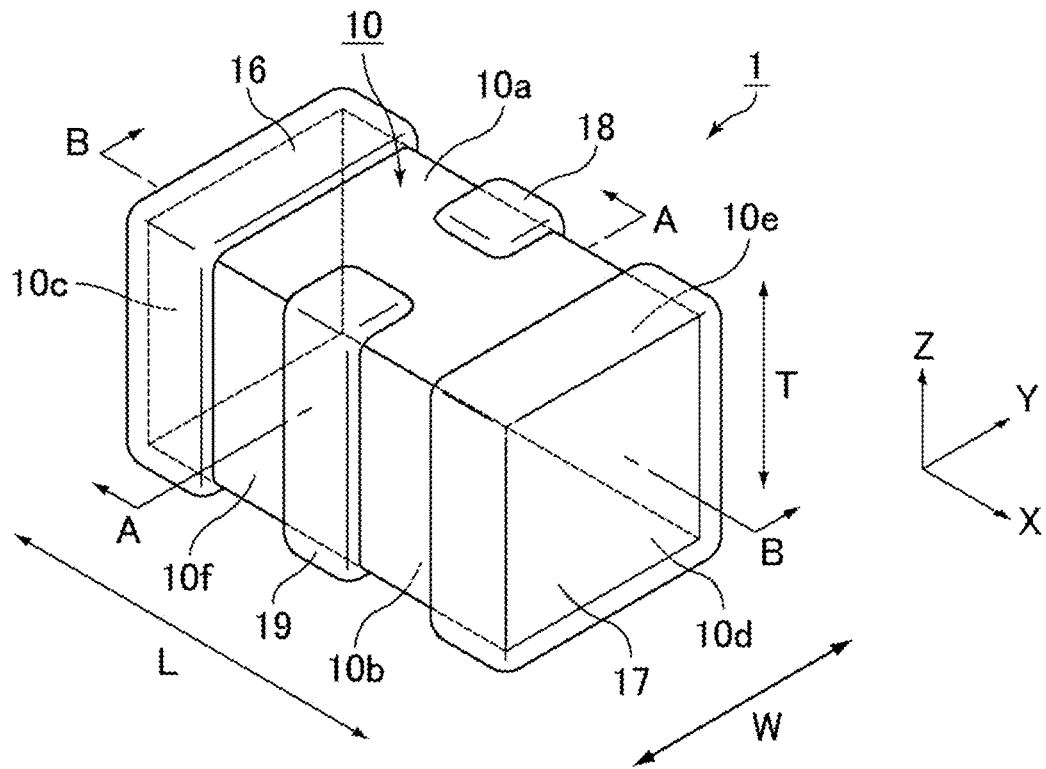
FIG. 1 is a perspective view showing an example of a multilayer ceramic capacitor according to a first preferred embodiment of the present invention.

FIG. 1 is a perspective view showing an example of a multilayer ceramic capacitor according to a first preferred embodiment of the present invention.

A multilayer ceramic capacitor 1 shown in FIG. 1 includes a laminate 10, a first signal external electrode 16 as a first external electrode, a second signal external electrode 17 as a second external electrode, and a pair of grounding external electrodes 18 and 19 as third external electrodes.

In the multilayer ceramic capacitor 1, for example, the first signal external electrode 16 and the second signal external electrode 17 are electrically connected in series to a power line, and the pair of grounding external electrodes 18 and 19 is connected to the ground (a ground line).

The laminate 10 has a cuboid or substantially cuboid shape, and includes a pair of main surfaces 10a and 10b opposing each other in a Z-axis direction shown in figures (first direction), a pair of end surfaces 10c and 10d opposing each other in an X-axis direction shown in figures (second direction perpendicular or substantially perpendicular to the first direction), and a pair of lateral surfaces 10e and 10f opposing each other in a Y-axis direction shown in figures (third direction perpendicular or substantially perpendicular to the first direction and the second direction).

As shown in FIG. 1, the first signal external electrode 16 and the second signal external electrode 17 are spaced apart from each other to respectively cover the end surfaces 10c and 10d of the laminate 10. More specifically, the first signal external electrode 16 covers the end surface 10c of the laminate 10, a portion of the pair of main surfaces 10a and 10b which is adjacent to or in a vicinity of the end surface 10c, and a portion of the pair of lateral surfaces 10e and 10f which is adjacent to or in a vicinity of the end surface 10c. The second signal external electrode 17 covers the end surface 10d of the laminate 10, a portion of the pair of main surfaces 10a and 10b which is adjacent to or in a vicinity of the end surface 10d, and a portion of the pair of lateral surfaces 10e and 10f which is adjacent to or in a vicinity of end surface 10d.

The grounding external electrodes 18 and 19 are spaced apart from each other to respectively cover the lateral surfaces 10e and 10f of the laminate 10. More specifically, the grounding external electrode 18 covers a central portion of the lateral surface 10e of the laminate 10 in the X-axis direction, a central portion of the main surface 10a in the X-axis direction which is adjacent to or in a vicinity of the lateral surface 10e, and a central portion of the main surface 10b in the X-axis direction which is adjacent to or in a vicinity of the lateral surface 10e. The grounding external electrode 19 covers a central portion of the lateral surface 10f of the laminate 10 in the X-axis direction, a central portion of the main surface 10a in the X-axis direction which is adjacent to or in a vicinity of the lateral surface 10f, and a central portion of the main surface 10b in the X-axis direction which is adjacent to or in a vicinity of the lateral surface 10f.

Each of the first signal external electrode 16, the second signal external electrode 17, and the pair of grounding external electrodes 18 and 19 includes a conductive film, for example, metal films with a sintered metal layer and a plated layer. The sintered metal layer is formed by baking a paste, for example, a Cu, Ni, Ag, Pd, Ag—Pd alloy, or Au paste. The plated layer is preferably made of, for example, a Ni plated layer and a Sn plated layer covering the Ni plated layer. The plated layer may be a Cu plated layer or an Au plated layer instead. The first signal external electrode 16, the second signal external electrode 17, and the pair of grounding external electrodes 18 and 19 may include only plated layers or may include a conductive resin paste.

Figure 2:
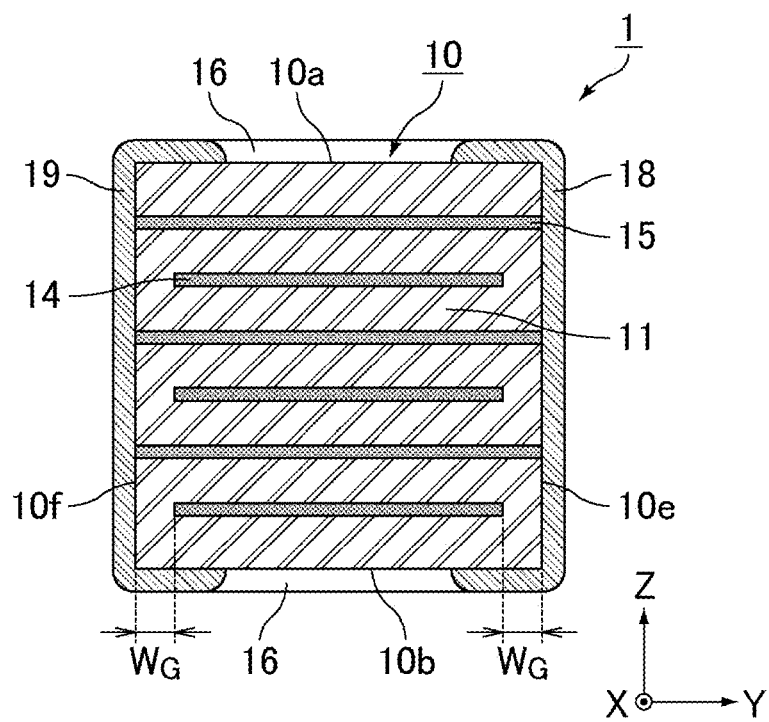
FIG. 2 is a WT cross-sectional view taken along line A-A of the multilayer ceramic capacitor shown in FIG. 1.
Figure 3:
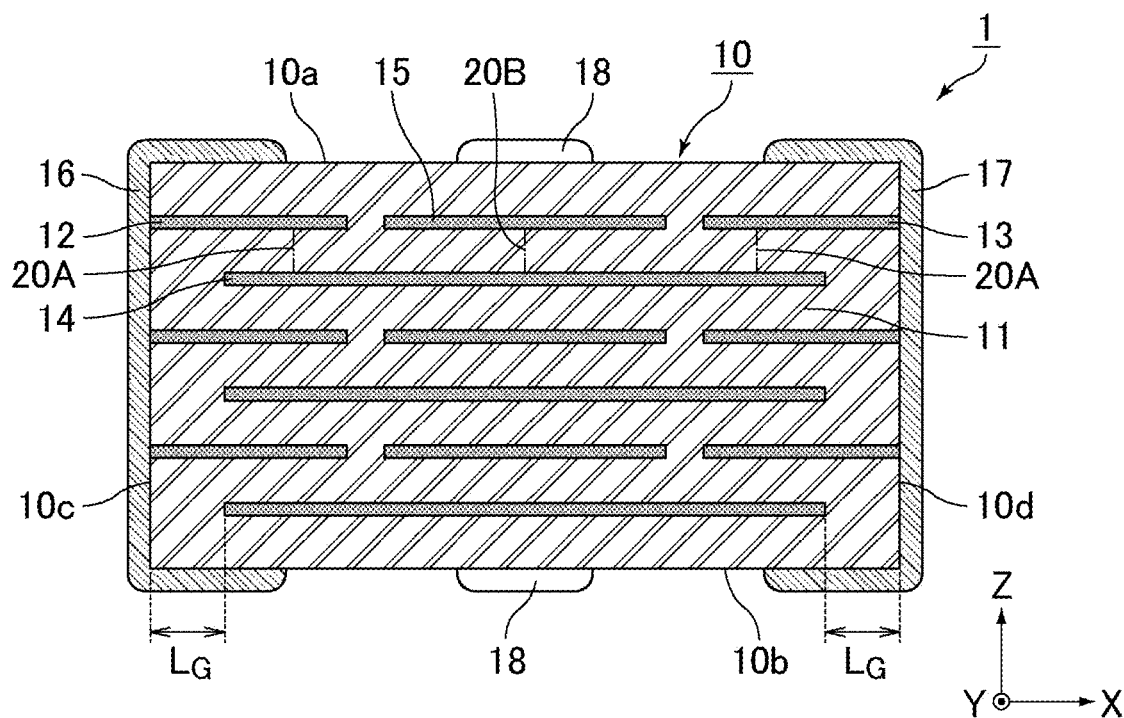
FIG. 3 is an LT cross-sectional view taken along line B-B of the multilayer ceramic capacitor shown in FIG. 1.
Figure 4A:
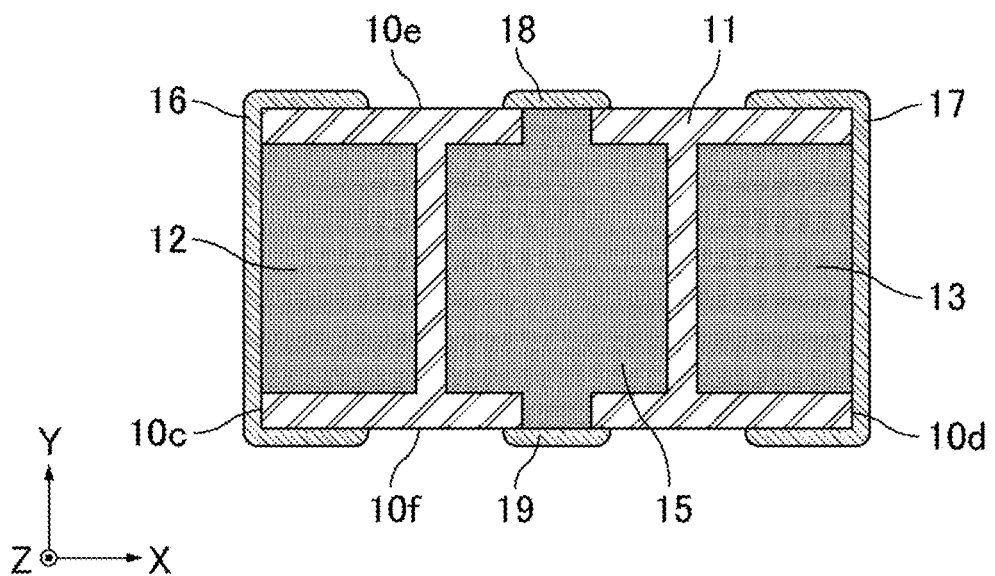
FIG. 4A is an LW cross-sectional view of a portion including a first signal internal electrode layer, a second signal internal electrode layer, and a grounding internal electrode layer of the multilayer ceramic capacitor shown in FIG. 2 and FIG. 3.
Figure 4B:
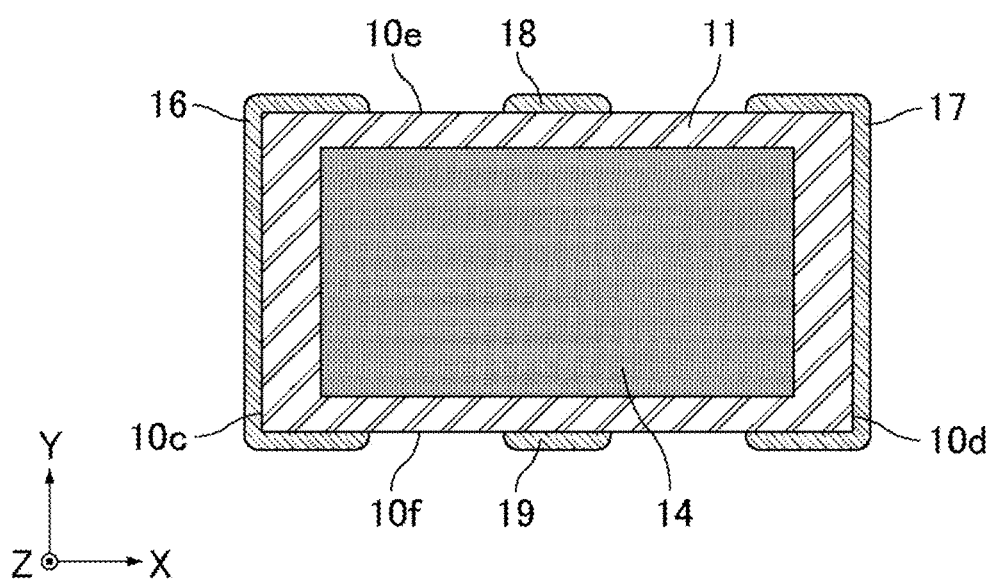
FIG. 4B is an LW cross-sectional view of a portion including a floating internal electrode layer of the multilayer ceramic capacitor shown in FIG. 2 and FIG. 3.

FIG. 2 is a WT cross-sectional view taken along line A-A of the multilayer ceramic capacitor shown in FIG. 1. FIG. 3 is an LT cross-sectional view taken along line B-B of the multilayer ceramic capacitor shown in FIG. 1. FIG. 4A is an LW cross-sectional view of a portion including a first signal internal electrode layer, a second signal internal electrode layer, and a grounding internal electrode layer of the multilayer ceramic capacitor shown in FIG. 2 and FIG. 3. FIG. 4B is an LW cross-sectional view of a portion including a floating internal electrode layer of the multilayer ceramic capacitor shown in FIG. 2 and FIG.

As shown in FIG. 2 and FIG. 3, the laminate 10 includes dielectric layers 11 and internal electrode layers 12, 13, 14, and alternately laminated in the first direction (i.e., Z-axis direction). The internal electrode layers 12, 13, 14, and 15 inside the laminate 10 are provided as multiple layers separated by the dielectric layers 11.

The dielectric layers 11 are preferably made of a ceramic material mainly including, for example, barium titanate. The dielectric layers 11 may include accessory components, for example, Mn compounds, Mg compounds, Si compounds, Co compounds, Ni compounds, or rare earth compounds, of ceramic powder which defines and functions as raw materials of a ceramic sheet (described later). The internal electrode layers 12, 13, 14, and 15 include a metal material, for example, Ni.

The material of the dielectric layers 11 is not limited to the above-described ceramic material mainly including barium titanate. Other ceramic materials having a high dielectric constant (e.g., those mainly including $CaTiO_3$, $SrTiO_3$, $CaZrO_3$, or the like) may be selected as materials of the dielectric layers 11. The material of the internal electrode layers 12, 13, 14, and 15 is also not limited to Ni described above. Other conductive materials, for example, metal materials, for example, Cu, Ag, Pd, Ag—Pd alloys, and Au, may be selected as materials of the internal electrode layers 12, 13, 14, and 15.

As shown in FIG. 1, the first direction (i.e., Z-axis direction) which is the lamination direction of the dielectric layers 11 and the internal electrode layers 12, 13, 14, and 15 of the laminate 10 may be defined as a thickness direction T. The second direction (i.e., X-axis direction) which is the alignment direction of the first signal external electrode 16 and the second signal external electrode 17 may be defined as a length direction L. The third direction (i.e., Y-axis direction) which is the alignment direction of the pair of grounding external electrodes 18 and 19 may be defined as a width direction W.

As shown in FIG. 2, a cross section of the multilayer ceramic capacitor 1 or the laminate 10 perpendicular or substantially perpendicular to the pair of lateral surfaces 10e and 10f and parallel or substantially parallel to the thickness direction T is referred to as a WT cross section which is a cross section in the width direction W and the thickness direction T. As shown in FIG. 3, a cross section of the multilayer ceramic capacitor 1 or the laminate 10 perpendicular or substantially perpendicular to the pair of end surfaces 10c and 10d and parallel or substantially parallel to the thickness direction T is referred to as an LT cross section which is a cross section in the length direction L and the thickness direction T. As shown in FIGS. 4A and 4B, a cross section of the multilayer ceramic capacitor 1 or the laminate 10 perpendicular or substantially perpendicular to the pair of end surfaces 10c and 10d, the pair of lateral surfaces 10e and 10f, and the thickness direction T is referred to as an LW cross section which is a cross section in the length direction L and the width direction W.

Preferably, for example, the laminate 10 defining the multilayer ceramic capacitor 1 has a dimension in the length direction L (second direction) that is larger than a dimension in the width direction W (third direction).

Typical values of the overall dimension in the length direction L×the overall dimension in the width direction W of the multilayer ceramic capacitor 1 are, for example, about 1.0 mm×about 0.5 mm, about 1.6 mm×about 0.8 mm, about 2.0 mm×about 1.25 mm, about 3.2 mm×about 1.6 mm, about 3.2 mm×about 2.5 mm, about 4.5 mm×about 2.0 mm, about 4.5 mm×about 3.2 mm, or about 5.7 mm×about 5.0 mm. In the multilayer ceramic capacitor 1, the overall dimension in the thickness direction T may be the same or substantially the same as the overall dimension in the width direction W.

The internal electrode layers 12, 13, 14, and 15 include the first signal internal electrode layer 12 as a first internal electrode layer, the second signal internal electrode layer 13 as a second internal electrode layer, the floating internal electrode layer 14 as a third internal electrode layer, and the grounding internal electrode layer 15 as a fourth internal electrode layer.

As shown in FIG. 4A, the first signal internal electrode layer 12, the second signal internal electrode layer 13, and the grounding internal electrode layer 15 are aligned in a single plane perpendicular or substantially perpendicular to the lamination direction (i.e., Z-axis direction). Thus, the first signal internal electrode layer 12, the second signal internal electrode layer 13, and the grounding internal electrode layer 15 are located in the same or substantially the same plane that is a first plane.

As shown in FIG. 4B, the floating internal electrode layer 14 is located in a second plane different from the first plane where the first signal internal electrode layer 12, the second signal internal electrode layer 13, and the grounding internal electrode layer 15 are provided. The floating internal electrode layer 14 opposes each of the first signal internal electrode layer 12, the second signal internal electrode layer 13, and the grounding internal electrode layer 15. Thus, when viewed in the lamination direction (Z-axis direction), the first signal internal electrode layer 12 and the second signal internal electrode layer 13 each overlap a portion of the floating internal electrode layer 14, and the grounding internal electrode layer 15 overlaps another portion of the floating internal electrode layer 14.

The first signal internal electrode layer 12 is connected to the first signal external electrode 16 and not connected to either the second signal external electrode 17 or the pair of grounding external electrodes 18 and 19. Specifically, as shown in FIG. 4A, one end of the first signal internal electrode layer 12 in the X-axis direction is exposed to the end surface 10c of the laminate 10. Thus, the first signal internal electrode layer 12 is connected to the first signal external electrode 16 covering the end surface 10c. The other end of the first signal internal electrode layer 12 in the X-axis direction is covered by the dielectric layer 11 and is thus not exposed to the end surface 10d of the laminate 10. Thus, the first signal internal electrode layer 12 is not connected to the second signal external electrode 17. In addition, the ends of the first signal internal electrode layer 12 in the Y-axis direction are covered by the dielectric layer 11 and are thus not exposed to the pair of lateral surfaces 10e and 10f of the laminate 10. Thus, the first signal internal electrode layer 12 is not connected to the pair of grounding external electrodes 18 and 19.

The second signal internal electrode layer 13 is connected to the second signal external electrode 17 and not connected to either the first signal external electrode 16 or the pair of grounding external electrodes 18 and 19. Specifically, as shown in FIG. 4A, one end of the second signal internal electrode layer 13 in the X-axis direction is exposed to the end surface 10d of the laminate 10. Thus, the second signal internal electrode layer 13 is connected to the second signal external electrode 17 covering the end surface 10d. The other end of the second signal internal electrode layer 13 in the X-axis direction is covered by the dielectric layer 11 and is thus not exposed to the end surface 10c of the laminate 10. Thus, the second signal internal electrode layer 13 is not connected to the first signal external electrode 16. In addition, the ends of the second signal internal electrode layer 13 in the Y-axis direction are covered by the dielectric layer 11 and are thus not exposed to the pair of lateral surfaces 10e and 10f of the laminate 10. Thus, the second signal internal electrode layer 13 is not connected to the pair of grounding external electrodes 18 and 19.

The floating internal electrode layer 14 is not connected to any of the first signal external electrode 16, the second signal external electrode 17, or the pair of grounding external electrodes 18 and 19. Specifically, as shown in FIG. 4B, the ends of the floating internal electrode layer 14 in the X-axis direction are covered by the dielectric layer 11 and are thus not exposed to the pair of end surfaces 10c and 10d of the laminate 10. Thus, the floating internal electrode layer 14 is not connected to either the first signal external electrode 16 or the second signal external electrode 17. In addition, the ends of the floating internal electrode layer 14 in the Y-axis direction are covered by the dielectric layer 11 and are thus not exposed to the pair of lateral surfaces 10e and 10f of the laminate 10. Thus, the floating internal electrode layer 14 is not connected to the pair of grounding external electrodes 18 and 19.

The grounding internal electrode layer 15 is connected to the pair of grounding external electrodes 18 and 19 and not connected to either the first signal external electrode 16 or the second signal external electrode 17. Specifically, as shown in FIG. 4A, the ends of the grounding internal electrode layer 15 in the Y-axis direction are exposed to the pair of lateral surfaces 10e and 10f of the laminate 10. Thus, the grounding internal electrode layer 15 is connected to the pair of grounding external electrodes 18 and 19 respectively covering the lateral surfaces 10e and 10f. The ends of the grounding internal electrode layer 15 in the X-axis direction are covered by the dielectric layer 11 and are thus not exposed to the pair of end surfaces 10c and 10d of the laminate 10. Thus, the grounding internal electrode layer 15 is not connected to either the first signal external electrode 16 or the second signal external electrode 17.

In the multilayer ceramic capacitor 1, the first signal internal electrode layer 12, the second signal internal electrode layer 13, the floating internal electrode layer 14, and the grounding internal electrode layer 15 define an internal electrode layer group, and multiple such internal electrode layer groups are laminated in the lamination direction (Z-axis direction) in order to increase the capacitance.

With the above features, as shown in FIG. 3, the first signal internal electrode layer 12 or the second signal internal electrode layer 13 opposes the floating internal electrode layer to define a first capacitor element 20A, and the floating internal electrode layer 14 opposes the grounding internal electrode layer 15 to define a second capacitor element 20B. Further, the first capacitor element 20A and the second capacitor element 20B are electrically connected in series via the floating internal electrode layer 14.

In the multilayer ceramic capacitor 1, since the first capacitor element 20A and the second capacitor element 20B are electrically connected in series, electrical insulation is provided by one of the capacitor elements in the event of dielectric breakdown in the other capacitor element, thus providing a high reliability, as in the case of the multilayer ceramic capacitor 100. Further, the first capacitor element 20A and the second capacitor element 20B are adjacent to or in a vicinity of the first signal internal electrode layer 12 or the second signal internal electrode layer 13 respectively connected to the first signal external electrode 16 or the second signal external electrode 17, and extra wiring is able to be substantially eliminated and thus ESL is able to be significantly reduced.

Unlike the multilayer ceramic capacitor 100, when the multilayer ceramic capacitor 1 is viewed in the lamination direction (Z-axis direction), the effective portion of the first capacitor element 20A (i.e., an overlapping portion between the first signal internal electrode layer 12 or the second signal internal electrode layer 13 and the floating internal electrode layer 14) and the effective portion of the second capacitor element 20B (i.e., an overlapping portion between the floating internal electrode layer 14 and the grounding internal electrode layer 15) each do not overlap either the first signal external electrode 16 or the second signal external electrode 17 (see FIGS. 4A and 4B). Thus, even when warping cracking occurs at the ends of these external electrodes, the capacitor elements connected in series are prevented from breaking simultaneously, and the advantages described above are able to be provided.

Generally, an increase in the overall dimension of the multilayer ceramic capacitor 1 in the thickness direction T may result in the external electrodes being highly susceptible to warping cracking. However, the multilayer ceramic capacitor 1 is able to provide high reliability even when the overall dimension in the thickness direction T is large.

Further, according to processing conditions of the multilayer ceramic capacitor 100, a reduction in the width of the signal internal electrode layer 112 extending entirely in the X-axis direction, may be preferred, for example, which may increase a difficulty in printing the internal electrode layers and establishing a connection between the internal electrode layers and the external electrodes. In contrast, in the multilayer ceramic capacitor 1, the first signal internal electrode layer 12 and the second signal internal electrode layer 13 are each able to have a greater width, the internal electrode layers are able to be easily printed, and a connection between the internal electrode layers and the external electrode is able to be easily provided.

In the multilayer ceramic capacitor 1, the width of a W gap (the length indicated by $W_G$ in FIG. 2) is preferably about 30 μm or more, for example. The W gap refers to one lateral portion of the laminate 10 between one end of the first signal internal electrode layer 12, the second signal internal electrode layer 13, or the floating internal electrode layer 14 in the width direction W and the lateral surface 10e of the laminate 10. The W gap also refers to the other lateral portion of the laminate 10 between the other end of the first signal internal electrode layer 12, the second signal internal electrode layer 13, or the floating internal electrode layer 14 in the width direction W and the lateral surface 10f of the laminate 10.

In the multilayer ceramic capacitor 1, the width of an L gap (the length indicated by $L_G$ in FIG. 3) is preferably about 30 μm or more, for example. The L gap refers to one end portion of the laminate 10 between one end of the floating internal electrode layer 14 in the length direction L and the end surface 10c of the laminate 10. The L gap also refers to the other end portion of the laminate 10 between the other end of the floating internal electrode layer 14 in the length direction L and the end surface 10d of the laminate 10.

In the multilayer ceramic capacitor 1, the gap between the internal electrode layers in the same or substantially the same plane is preferably about 30 μm or more, for example.

The multilayer ceramic capacitor 1 described above may be produced as follows.

Figure 5:
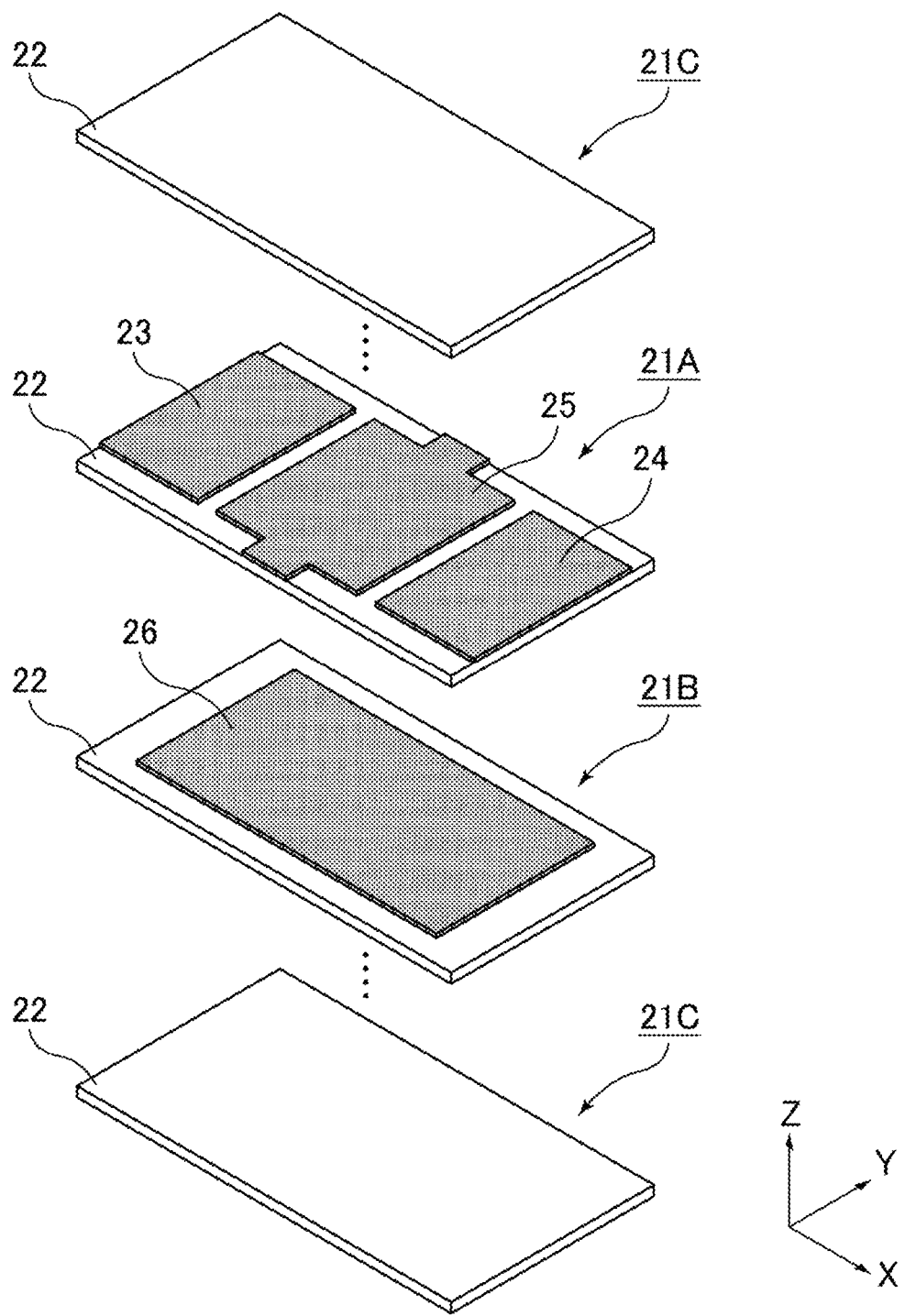
FIG. 5 is a perspective view that shows a non-limiting example of a method of producing a laminate 10 defining a multilayer ceramic capacitor 1.

FIG. 5 is a perspective view that shows a non-limiting example of a method of producing the laminate 10 defining the multilayer ceramic capacitor 1.

As shown in FIG. 5, three kinds of multiple material sheets, i.e., first material sheets 21A, second material sheets 21B, and third material sheets 21C, are provided.

The first material sheet 21A includes the following conductive patterns on a surface of a ceramic substrate 22: a conductive pattern 23 having a shape corresponding to the first signal internal electrode layer 12; a conductive pattern 24 having a shape corresponding to the second signal internal electrode layer 13; and a conductive pattern 25 having a shape corresponding to the grounding internal electrode layer 15. As a result of firing, the first material sheet 21A forms the first signal internal electrode layer 12, the second signal internal electrode layer 13, the grounding internal electrode layer 15, and a portion of the dielectric layer 11.

The second material sheet 21B includes a conductive pattern 26 having a shape corresponding to the floating internal electrode layer 14 on a surface of the ceramic substrate 22. As a result of firing, the second material sheet 21B forms the floating internal electrode layer 14 and a portion of the dielectric layer 11.

The third material sheet 21C includes only the ceramic substrate 22 not having conductive patterns on a surface. As a result of firing, the third material sheet 21C forms a portion of the dielectric layer 11.

The conductive patterns 23, 24, 25, and 26 may be formed by attaching a conductive paste to a surface of the ceramic substrate 22 (i.e., a green sheet) by a printing method, for example, gravure printing or screen printing.

One first material sheet 21A and one second material sheet 21B are provided as a pair, and multiple such pairs are stacked in the lamination direction (Z-axis direction). The third material sheets 21C are also stacked with each pair sandwiched therebetween or, with the third material sheet 21C inserted between each pair. Then, a group of the material sheets in the stack are compressed and fired. Thus, the laminate 10 is produced.

The case where one first material sheet 21A and one second material sheet 21B are provided as a pair is described above. The present invention, however, is not limited to the above case. For example, in order to reduce the DC resistance of the first signal internal electrode layer 12 and the second signal internal electrode layer 13, multiple first material sheets 21A and one second material sheet 21B may be provided as a pair.

The above described a production example where multiple first material sheets 21A, multiple second material sheets 21B, and multiple third material sheet 21C are provided and stacked, and the stack is then compressed and fired. Alternatively, the laminates 10 may be produced by providing multiple mother sheets including multiple first material sheets 21A, multiple mother sheets including multiple second material sheets 21B, and multiple mother sheets including multiple third material sheets 21C; stacking and compressing these multiple mother sheets to produce a mother block; cutting the mother block to obtain individual chips; and further firing these chips.

Subsequently, the first signal external electrode 16 and the second signal external electrode 17 are formed on the end surfaces of the laminate 10, and the pair of grounding external electrodes 18 and 19 is formed on the lateral surfaces of the laminate 10. Thus, the multilayer ceramic capacitor 1 is provided.

Figure 6:
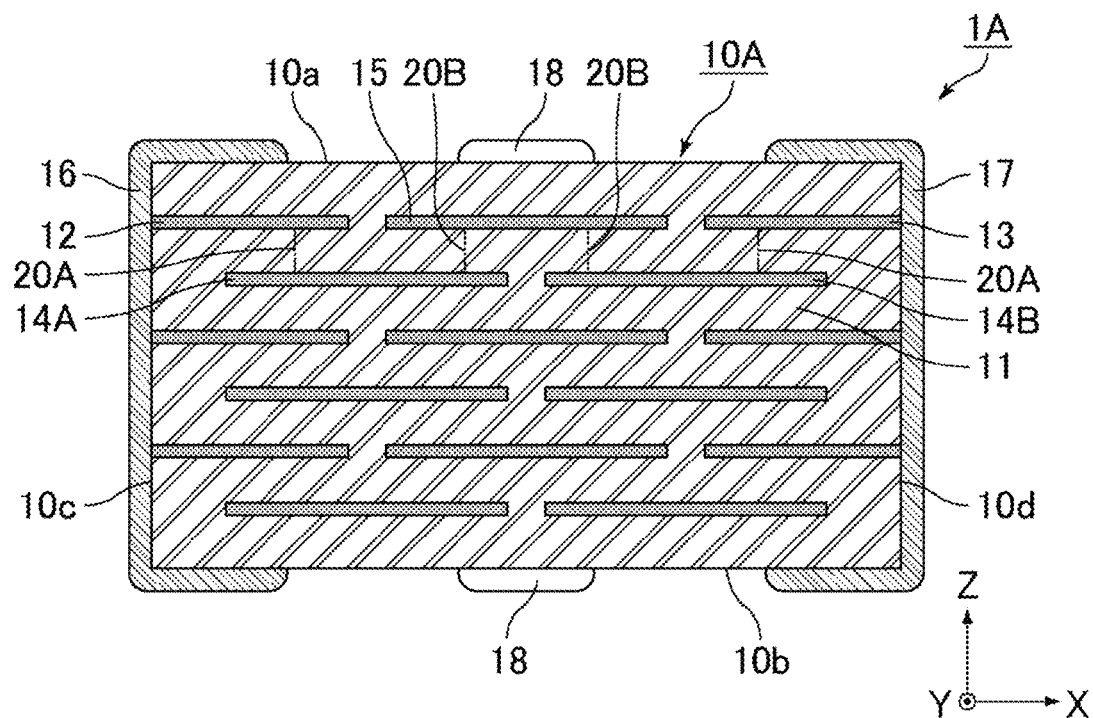
FIG. 6 is an LT cross-sectional view showing another example of the multilayer ceramic capacitor according to the first preferred embodiment of the present invention.
Figure 7A:
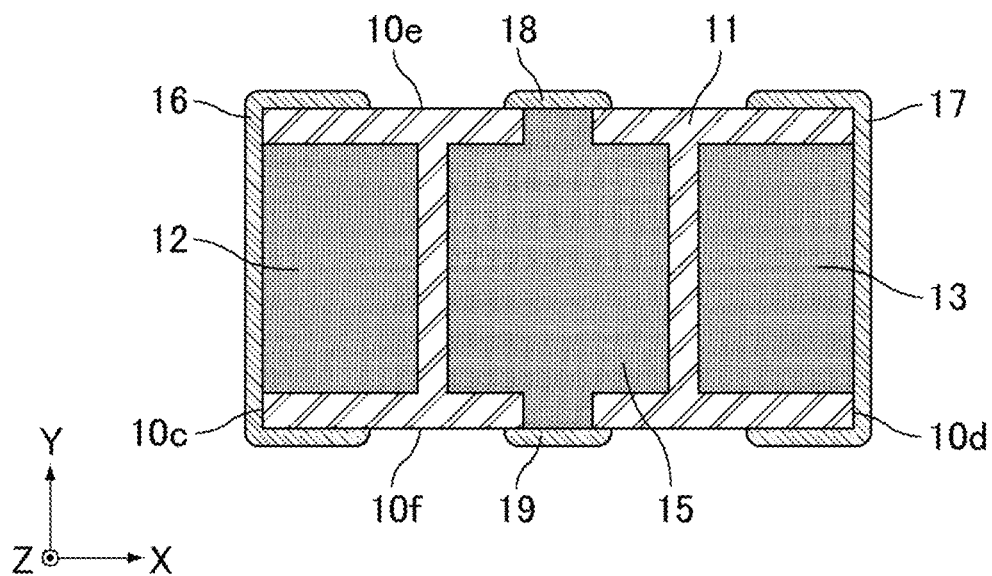
FIG. 7A is an LW cross-sectional view of a portion including a first signal internal electrode layer, a second signal internal electrode layer, and a grounding internal electrode layer of the multilayer ceramic capacitor shown in FIG. 6.
Figure 7B:
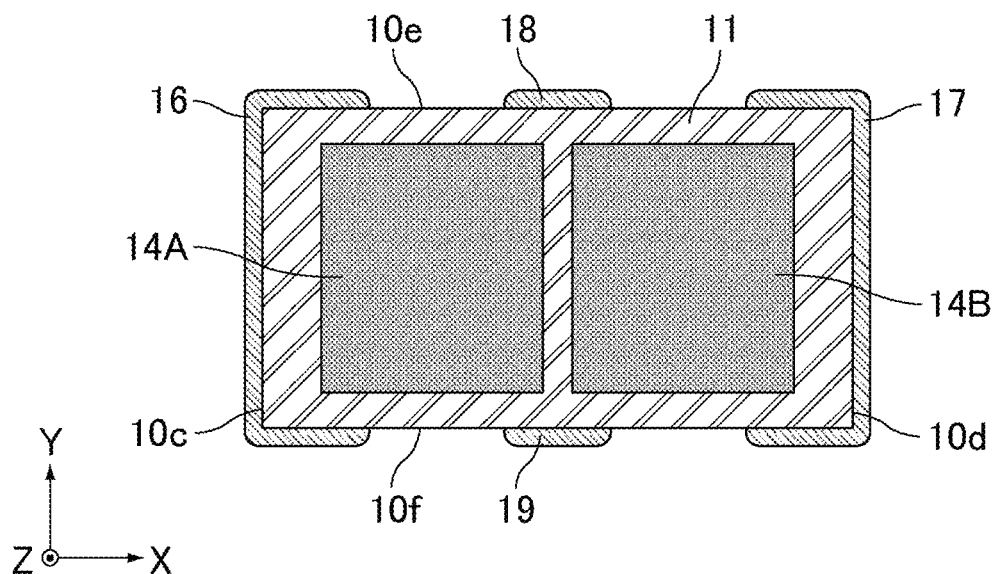
FIG. 7B is an LW cross-sectional view of a portion including floating internal electrode layers of the multilayer ceramic capacitor shown in FIG. 6.

FIG. 6 is an LT cross-sectional view showing another example of the multilayer ceramic capacitor according to the first preferred embodiment of the present invention. FIG. 7A is an LW cross-sectional view of a portion including a first signal internal electrode layer, a second signal internal electrode layer, and a grounding internal electrode layer of the multilayer ceramic capacitor shown in FIG. 6. FIG. 7B is an LW cross-sectional view of a portion including floating internal electrode layers of the multilayer ceramic capacitor shown in FIG. 6.

A multilayer ceramic capacitor 1A shown in FIG. 6 is different from the multilayer ceramic capacitor 1 shown in FIG. 3 in that it includes two floating internal electrode layers 14A and 14B.

The multilayer ceramic capacitor 1A shown in FIG. 6 includes a laminate 10A, the first signal external electrode 16 as a first external electrode, the second signal external electrode as a second external electrode, and the pair of grounding external electrodes 18 and 19 as third external electrodes.

Preferably, for example, the laminate 10A defining the multilayer ceramic capacitor 1A has a dimension in the length direction L (second direction) that is larger than a dimension in the width direction W (third direction).

Typical values of the overall dimension in the length direction L×the overall dimension in the width direction W of the multilayer ceramic capacitor 1A are, for example, about 1.0 mm×about 0.5 mm, about 1.6 mm×about 0.8 mm, about 2.0 mm×about 1.25 mm, about 3.2 mm×about 1.6 mm, about 3.2 mm×about 2.5 mm, about 4.5 mm×about 2.0 mm, about 4.5 mm×about 3.2 mm, or about 5.7 mm×about 5.0 mm. In the multilayer ceramic capacitor 1A, the overall dimension in the thickness direction T may be the same or substantially the same as the overall dimension in the width direction W.

As shown in FIG. 6, the laminate 10A includes the dielectric layers 11 and the internal electrode layers 12, 13, 14A, 14B, and 15 alternately laminated in the first direction (i.e., Z-axis direction). The internal electrode layers 12, 13, 14A, 14B, and 15 inside the laminate 10A are provided as multiple layers separated by the dielectric layers 11.

The internal electrode layers 12, 13, 14A, 14B, and 15 include the first signal internal electrode layer 12 as a first internal electrode layer, the second signal internal electrode layer 13 as a second internal electrode layer, the floating internal electrode layers 14A and 14B as third internal electrode layers, and the grounding internal electrode layer 15 as a fourth internal electrode layer.

As shown in FIG. 7A, the first signal internal electrode layer 12, the second signal internal electrode layer 13, and the grounding internal electrode layer 15 are aligned in a single plane perpendicular or substantially perpendicular to the lamination direction (i.e., Z-axis direction). Thus, the first signal internal electrode layer 12, the second signal internal electrode layer 13, and the grounding internal electrode layer 15 are located in the same or substantially the same plane that is a first plane.

As shown in FIG. 7B, the floating internal electrode layers 14A and 14B are located in a second plane different from the first plane where the first signal internal electrode layer 12, the second signal internal electrode layer 13, and the grounding internal electrode layer 15 are provided. The floating internal electrode layer 14A opposes each of the first signal internal electrode layer 12 and the grounding internal electrode layer 15, and the floating internal electrode layer 14B opposes each of the second signal internal electrode layer 13 and the grounding internal electrode layer 15. Thus, when viewed in the lamination direction (Z-axis direction), the first signal internal electrode layer 12 overlaps a portion of the floating internal electrode layer 14A, and the grounding internal electrode layer 15 overlaps another portion of the floating internal electrode layer 14A. Further, the second signal internal electrode layer 13 overlaps a portion of the floating internal electrode layer 14B, and the grounding internal electrode layer 15 overlaps another portion of the floating internal electrode layer 14B.

The floating internal electrode layers 14A and 14B are not connected to any of the first signal external electrode 16, the second signal external electrode 17, or the pair of grounding external electrodes 18 and 19. Specifically, as shown in FIG. 7B, the ends of the floating internal electrode layers 14A and 14B in the X-axis direction are covered by the dielectric layer 11 and are thus not exposed to the pair of end surfaces 10c and 10d of the laminate 10. Thus, the floating internal electrode layers 14A and 14B are not connected to either the first signal external electrode 16 or the second signal external electrode 17. In addition, the ends of the floating internal electrode layers 14A and 14B in the Y-axis direction are covered by the dielectric layer 11 and are thus not exposed to the pair of lateral surfaces 10e and 10f of the laminate 10. Thus, the floating internal electrode layers 14A and 14B are not connected to the pair of grounding external electrodes 18 and 19.

With the above features, as shown in FIG. 6, the first signal internal electrode layer 12 or the second signal internal electrode layer 13 opposes the floating internal electrode layer 14A or 14B respectively to define the first capacitor element 20A, and the floating internal electrode layer 14A or 14B opposes the grounding internal electrode layer 15 to define the second capacitor element 20B. Further, the first capacitor element 20A and the second capacitor element 20B are electrically connected in series via the floating internal electrode layer 14A or 14B.

In the multilayer ceramic capacitor 1A, since the first capacitor element 20A and the second capacitor element 20B are electrically connected in series, the same or similar advantages provided by the multilayer ceramic capacitor 1 are able to be provided.

In the multilayer ceramic capacitor 1A, the width of the W gap is preferably about 30 µm or more, for example. The width of the L gap is preferably about 30 µm or more, for example. The distance between the internal electrode layers in the same or substantially the same plane is preferably about 30 µm or more, for example.

Second Preferred Embodiment

In a multilayer ceramic capacitor according to a second preferred embodiment of the present invention, three capacitor elements are electrically connected in series.

Figure 8:
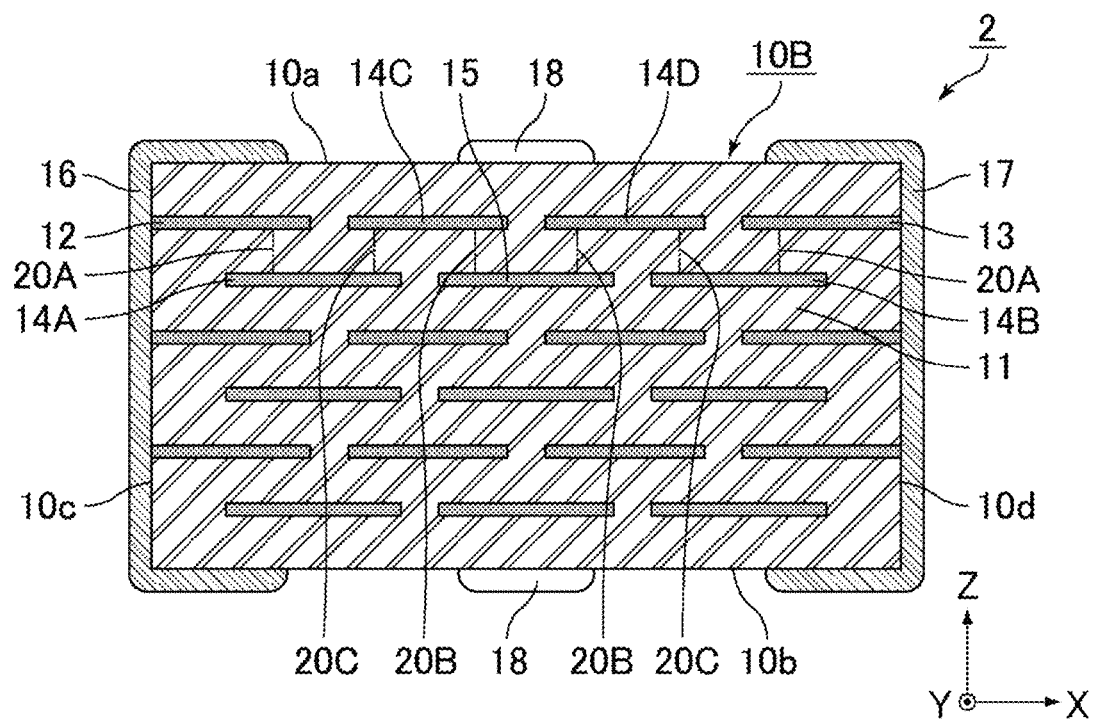
FIG. 8 is an LT cross-sectional view showing an example of a multilayer ceramic capacitor according to a second preferred embodiment of the present invention.
Figure 9A:
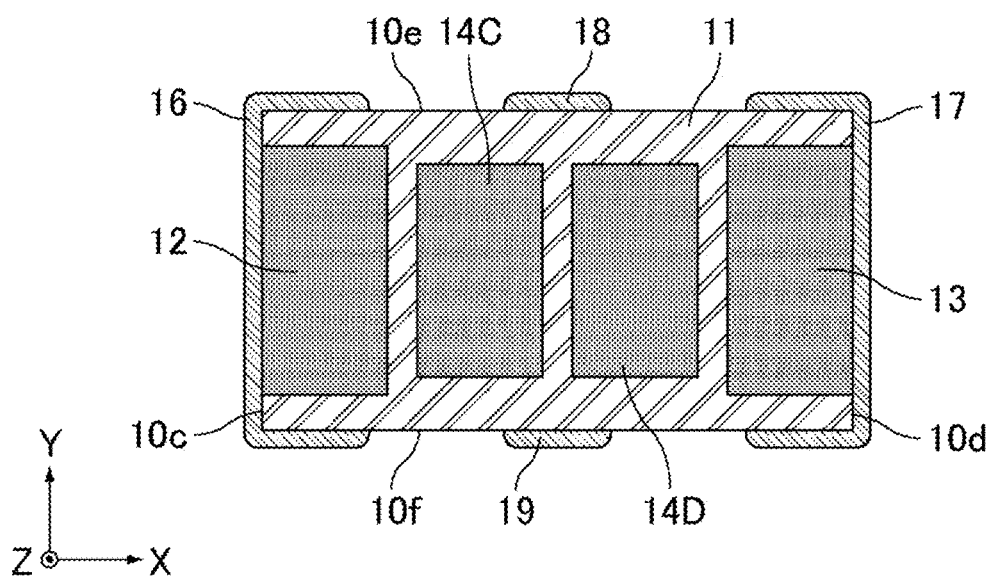
FIG. 9A is an LW cross-sectional view of a portion including a first signal internal electrode layer, a second signal internal electrode layer, and floating internal electrode layers of the multilayer ceramic capacitor shown in FIG. 8.
Figure 9B:
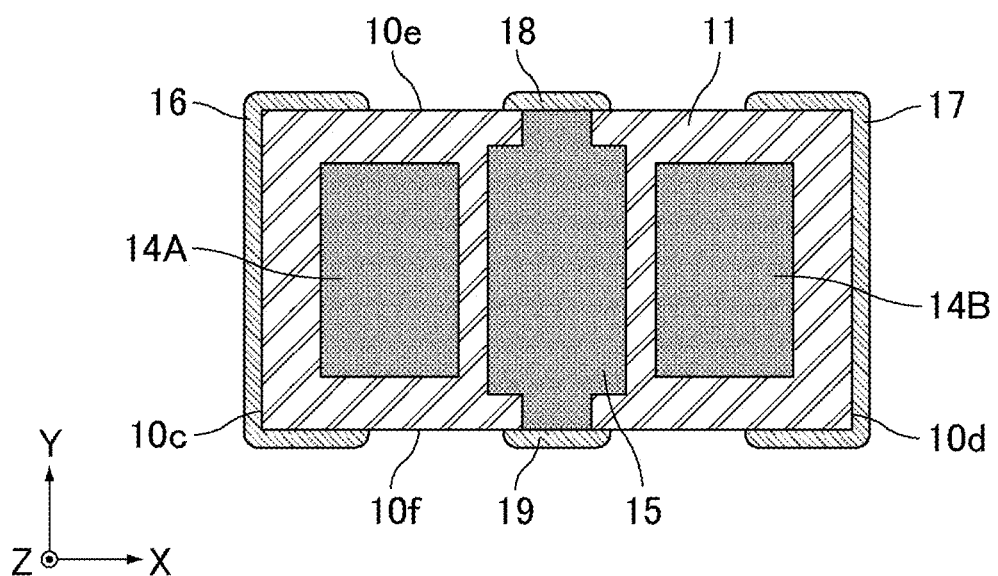
FIG. 9B is an LW cross-sectional view of a portion including floating internal electrode layers and a grounding internal electrode layer of the multilayer ceramic capacitor shown in FIG. 8.

FIG. 8 is an LT cross-sectional view showing an example of the multilayer ceramic capacitor according to the second preferred embodiment of the present invention. FIG. 9A is an LW cross-sectional view of a portion including a first signal internal electrode layer, a second signal internal electrode layer, and floating internal electrode layers of the multilayer ceramic capacitor shown in FIG. 8. FIG. 9B is an LW cross-sectional view of a portion including floating internal electrode layers and a grounding internal electrode layer of the multilayer ceramic capacitor shown in FIG. 8.

A multilayer ceramic capacitor 2 shown in FIG. 8 includes a laminate 10B, the first signal external electrode 16 as a first external electrode, a second signal external electrode 17 as a second external electrode, and a pair of grounding external electrodes 18 and 19 as third external electrodes.

Preferably, for example, the laminate 10B defining the multilayer ceramic capacitor 2 has a dimension in the length direction L (second direction) that is larger than a dimension in the width direction W (third direction).

Typical values of the overall dimension in the length direction L×the overall dimension in the width direction W of the multilayer ceramic capacitor 2 are, for example, about 1.0 mm×about 0.5 mm, about 1.6 mm×about 0.8 mm, about 2.0 mm×about 1.25 mm, about 3.2 mm×about 1.6 mm, about 3.2 mm×about 2.5 mm, about 4.5 mm×about 2.0 mm, about 4.5 mm×about 3.2 mm, or about 5.7 mm×about 5.0 mm. In the multilayer ceramic capacitor 2, the overall dimension in the thickness direction T may be the same or substantially the same as the overall dimension in the width direction W.

As show in FIG. 8, the laminate 10B includes the dielectric layers 11, the internal electrode layers 12, 13, 14A, 14B, and 15, and internal electrode layers 14C and 14D alternately laminated in the first direction (i.e., Z-axis direction). The internal electrode layers 12, 13, 14A, 14B, 14C, 14D, and 15 inside the laminate 10B are provided as multiple layers separated by the dielectric layers 11.

The internal electrode layers 12, 13, 14A, 14B, 14C, 14D, and 15 include the first signal internal electrode layer 12 as a first internal electrode layer, the second signal internal electrode layer 13 as a second internal electrode layer, the floating internal electrode layers 14A, 14B, 14C, and 14D as third internal electrode layers, and the grounding internal electrode layer 15 as a fourth internal electrode layer.

As shown in FIG. 9A, the first signal internal electrode layer 12, the second signal internal electrode layer 13, and the floating internal electrode layers 14C and 14D are aligned in a single plane perpendicular or substantially perpendicular to the lamination direction (i.e., Z-axis direction). Thus, the first signal internal electrode layer 12, the second signal internal electrode layer 13, and the floating internal electrode layers 14C and 14D are located in the same or substantially the same plane that is a first plane.

As shown in FIG. 9B, the floating internal electrode layers 14A and 14B and the grounding internal electrode layer 15 are located in a second plane different from the first plane where the first signal internal electrode layer 12, the second signal internal electrode layer 13, and the floating internal electrode layers 14C and 14D are provided. The floating internal electrode layer 14A opposes each of the first signal internal electrode layer 12 and the floating internal electrode layer 14C. The floating internal electrode layer 14B opposes each of the second signal internal electrode layer 13 and the floating internal electrode layer 14D. The grounding internal electrode layer 15 opposes each of the floating internal electrode layer 14C and the floating internal electrode layer 14D. Thus, when viewed in the lamination direction (Z-axis direction), the first signal internal electrode layer 12 overlaps a portion of the floating internal electrode layer 14A, and the floating internal electrode layer 14C overlaps another portion of the floating internal electrode layer 14A. Further, the second signal internal electrode layer 13 overlaps a portion of the floating internal electrode layer 14B, and the floating internal electrode layer 14D overlaps another portion of the floating internal electrode layer 14B. In addition, the floating internal electrode layer 14C overlaps a portion of the grounding internal electrode layer 15, and the floating internal electrode layer 14D overlaps another portion of the grounding internal electrode layer 15.

The floating internal electrode layers 14A, 14B, 14C, and 14D are not connected to any of the first signal external electrode 16, the second signal external electrode 17, or the pair of grounding external electrodes 18 and 19. Specifically, as shown in FIGS. 9A and 9B, the ends of the floating internal electrode layers 14A, 14B, 14C, and 14D in the X-axis direction are covered by the dielectric layer 11 and are thus not exposed to the pair of end surfaces 10c and 10d of the laminate 10. Thus, the floating internal electrode layers 14A, 14B, 14C, and 14D are not connected to either the first signal external electrode 16 or the second signal external electrode 17. In addition, the ends of the floating internal electrode layers 14A, 14B, 14C, and 14D in the Y-axis direction are covered by the dielectric layer 11 and are thus not exposed to the pair of lateral surfaces 10e and 10f of the laminate 10. Thus, the floating internal electrode layers 14A, 14B, 14C, and 14D are not connected to the pair of grounding external electrodes 18 and 19.

With the above features, as shown in FIG. 8, the first signal internal electrode layer 12 or the second signal internal electrode layer 13 opposes the floating internal electrode layer 14A or 14B respectively to define the first capacitor element 20A, and the floating internal electrode layer 14C or 14D opposes the grounding internal electrode layer 15 to define the second capacitor element 20B. In addition, the floating internal electrode layer 14A or 14B opposes the floating internal electrode layer 14C or 14D respectively to define a third capacitor element 20C. Further, the first capacitor element 20A, the second capacitor element 20B, and the third capacitor element 20C are electrically connected in series via the floating internal electrode layer 14A, 14B, 14C, or 14D.

In the multilayer ceramic capacitor 2, since the first capacitor element 20A, the second capacitor element 20B, and the third capacitor element 20C are electrically connected in series, a higher reliability than the multilayer ceramic capacitor 1, 1A, or 100 is able to be provided.

In the multilayer ceramic capacitor 100, the capacitor elements 120A and 120B are connected in series in the Y-axis direction (width direction W) in which the dimension of the multilayer ceramic capacitor 100 is smaller, and three or more capacitor elements are not easily able to be connected in series. In contrast, in the multilayer ceramic capacitor 2, the capacitor elements 20A, 20B, and 20C are connected in series in the X-axis direction (length direction L). Accordingly a greater number of capacitor elements are able to be connected in series.

In the multilayer ceramic capacitor 2, the width of the W gap is preferably about 30 μm or more, for example. The width of the L gap is preferably about 30 μm or more, for example. The distance between the internal electrode layers in the same or substantially the same plane is preferably about 30 μm or more, for example.

Third Preferred Embodiment

In a multilayer ceramic capacitor according to a third preferred embodiment of the present invention, four capacitor elements are electrically connected in series.

Figure 10:
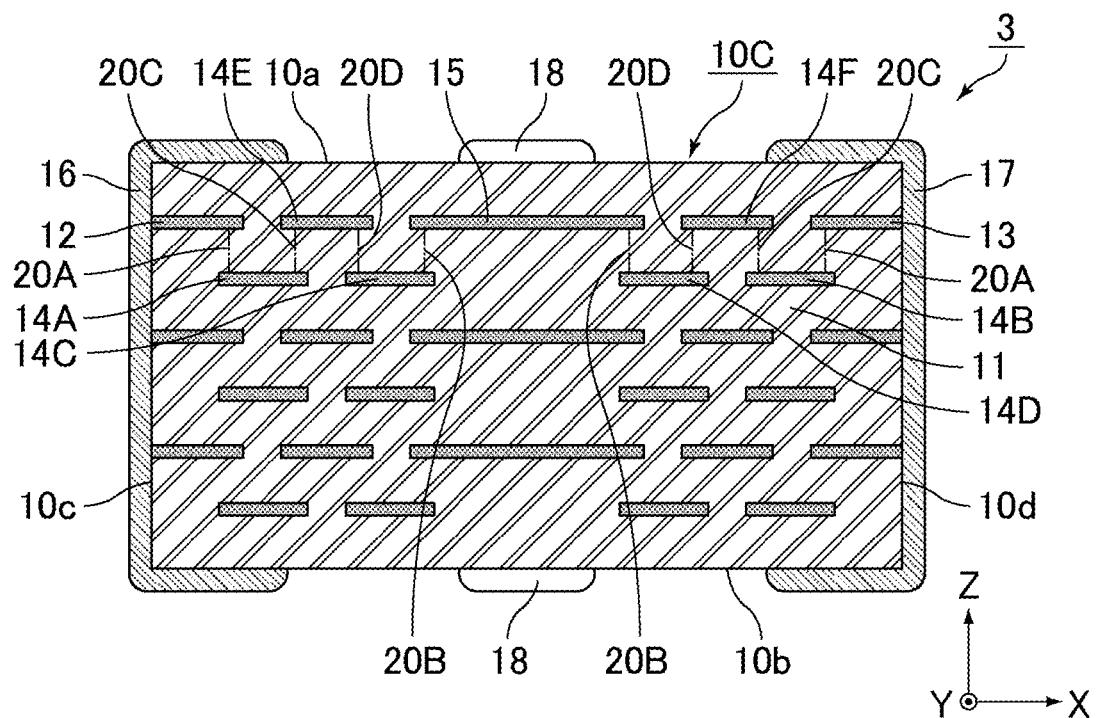
FIG. 10 is an LT cross-sectional view showing an example of a multilayer ceramic capacitor according to a third preferred embodiment of the present invention.
Figure 11A:
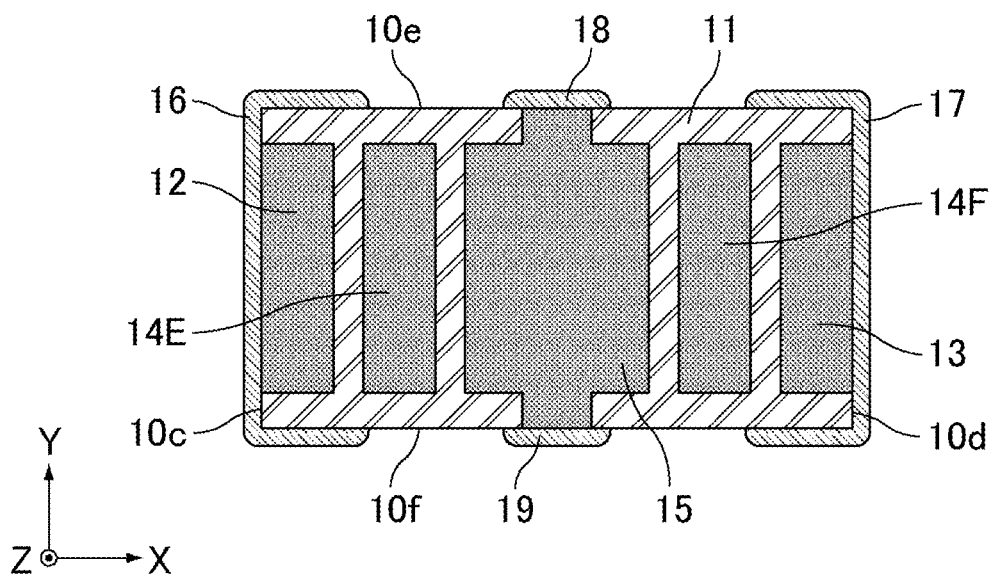
FIG. 11A is an LW cross-sectional view of a portion including a first signal internal electrode layer, a second signal internal electrode layer, floating internal electrode layers, and a grounding internal electrode layer of the multilayer ceramic capacitor shown in FIG. 10.
Figure 11B:
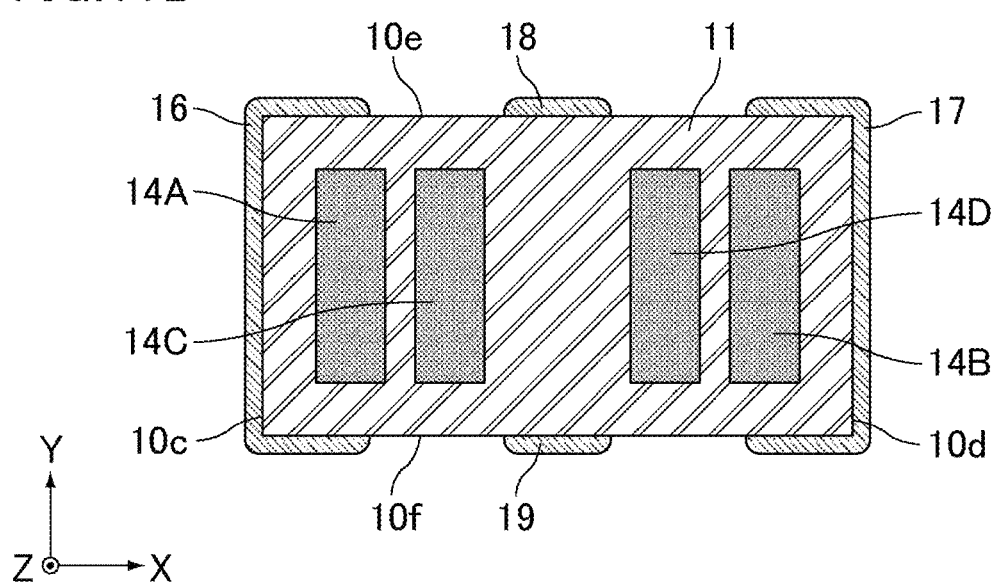
FIG. 11B is an LW cross-sectional view of a portion including floating internal electrode layers of the multilayer ceramic capacitor shown in FIG. 10.

FIG. 10 is an LT cross-sectional view showing an example of the multilayer ceramic capacitor according to the third preferred embodiment of the present invention. FIG. 11A is an LW cross-sectional view of a portion including a first signal internal electrode layer, a second signal internal electrode layer, floating internal electrode layers, and a grounding internal electrode layer of the multilayer ceramic capacitor shown in FIG. 10. FIG. 11B is an LW cross-sectional view of a portion including floating internal electrode layers of the multilayer ceramic capacitor shown in FIG. 10.

A multilayer ceramic capacitor 3 shown in FIG. 10 includes a laminate 100, the first signal external electrode 16 as a first external electrode, the second signal external electrode as a second external electrode, and the pair of grounding external electrodes 18 and 19 as third external electrodes.

Preferably, for example, the laminate 100 defining the multilayer ceramic capacitor 3 has a dimension in the length direction L (second direction) that is larger than a dimension in the width direction W (third direction).

Typical values of the overall dimension in the length direction L×the overall dimension in the width direction W of the multilayer ceramic capacitor 3 are, for example, about 1.0 mm×about 0.5 mm, about 1.6 mm×about 0.8 mm, about 2.0 mm×about 1.25 mm, about 3.2 mm×about 1.6 mm, about 3.2 mm×about 2.5 mm, about 4.5 mm×about 2.0 mm, about 4.5 mm×about 3.2 mm, or about 5.7 mm×about 5.0 mm. In the multilayer ceramic capacitor 3, the overall dimension in the thickness direction T may be the same or substantially the same as the overall dimension in the width direction W.

As shown in FIG. 10, the laminate 10C includes the dielectric layers 11, the internal electrode layers 12, 13, 14A, 14B, 14C, 14D, and 15, and internal electrode layers 14E and 14F alternately laminated in the first direction (i.e., Z-axis direction). The internal electrode layers 12, 13, 14A, 14B, 14C, 14D, 14E, 14F, and 15 inside the laminate 10C are provided as multiple layers separated by the dielectric layers 11.

The internal electrode layers 12, 13, 14A, 14B, 14C, 14D, 14E, 14F, and 15 include the first signal internal electrode layer 12 as a first internal electrode layer, the second signal internal electrode layer 13 as a second internal electrode layer, the floating internal electrode layers 14A, 14B, 14C, 14D, 14E, and 14F as third internal electrode layers, and the grounding internal electrode layer 15 as a fourth internal electrode layer.

As shown in FIG. 11A, the first signal internal electrode layer 12, the second signal internal electrode layer 13, the floating internal electrode layers 14E and 14F, and the grounding internal electrode layer 15 are aligned in a single plane perpendicular or substantially perpendicular to the lamination direction (i.e., Z-axis direction). Thus, the first signal internal electrode layer 12, the second signal internal electrode layer 13, the floating internal electrode layers 14E and 14F, and the grounding internal electrode layer 15 are located in the same or substantially the same plane that is a first plane.

As shown in FIG. 11B, the floating internal electrode layers 14A, 14B, 14C, and 14D are located in a second plane different from the first plane where the first signal internal electrode layer 12, the second signal internal electrode layer 13, the floating internal electrode layers 14E and 14F, and the grounding internal electrode layer 15 are provided. The floating internal electrode layer 14A opposes each of the first signal internal electrode layer 12 and the floating internal electrode layer 14E. The floating internal electrode layer 14B opposes each of the second signal internal electrode layer 13 and the floating internal electrode layer 14F. The floating internal electrode layer 14C opposes each of the floating internal electrode layer 14E and the grounding internal electrode layer 15. The floating internal electrode layer 14D opposes each of the floating internal electrode layer 14F and the grounding internal electrode layer 15. Thus, when viewed in the lamination direction (Z-axis direction), the first signal internal electrode layer 12 overlaps a portion of the floating internal electrode layer 14A, and the floating internal electrode layer 14E overlaps another portion of the floating internal electrode layer 14A. Further, the second signal internal electrode layer 13 overlaps a portion of the floating internal electrode layer 14B, and the floating internal electrode layer 14F overlaps another portion of the floating internal electrode layer 14B. In addition, the floating internal electrode layer 14E overlaps a portion of the floating internal electrode layer 14C, and the grounding internal electrode layer 15 overlaps another portion of the floating internal electrode layer 14C. Still further, the floating internal electrode layer 14F overlaps a portion of the floating internal electrode layer 14D, and the grounding internal electrode layer 15 overlaps another portion of the floating internal electrode layer 14D.

The floating internal electrode layers 14A, 14B, 14C, 14D, 14E, and 14F are not connected to any of the first signal external electrode 16, the second signal external electrode 17, or the pair of grounding external electrodes 18 and 19. Specifically, as shown in FIGS. 11A and 11B, the ends of the floating internal electrode layers 14A, 14B, 14C, 14D, 14E, and 14F in the X-axis direction are covered by the dielectric layer 11 and are thus not exposed to the pair of end surfaces 10c and 10d of the laminate 10. Thus, the floating internal electrode layers 14A, 14B, 14C, 14D, 14E, and 14F are not connected to either the first signal external electrode 16 or the second signal external electrode 17. In addition, the ends of the floating internal electrode layers 14A, 14B, 14C, 14D, 14E, and 14F in the Y-axis direction are covered by the dielectric layer 11 and are thus not exposed to the pair of lateral surfaces 10e and 10f of the laminate 10. Thus, the floating internal electrode layers 14A, 14B, 14C, 14D, 14E, and 14F are not connected to the pair of grounding external electrodes 18 and 19.

With the above features, as shown in FIG. 10, the first signal internal electrode layer 12 or the second signal internal electrode layer 13 opposes the floating internal electrode layer 14A or 14B to respectively define the first capacitor element 20A, and the floating internal electrode layer 14C or 14D opposes the grounding internal electrode layer 15 to define the second capacitor element 20B. In addition, the floating internal electrode layer 14A or 14B opposes the floating internal electrode layer 14E or 14F respectively to define the third capacitor element 20C, and the floating internal electrode layer 14C or 14D opposes the floating internal electrode layer 14E or 14F respectively to define a fourth capacitor element 20D. Further, the first capacitor element 20A, the second capacitor element 20B, the third capacitor element 20C, and the fourth capacitor element 20D are electrically connected in series via the floating internal electrode layer 14A, 14B, 14C, 14D, 14E, or 14F.

In the multilayer ceramic capacitor 3, since the first capacitor element 20A, the second capacitor element 20B, the third capacitor element 20C, and the fourth capacitor element 20D are electrically connected in series, a higher reliability than the multilayer ceramic capacitor 2 is able to be provided.

In the multilayer ceramic capacitor 3, the width of the W gap is preferably about 30 μm or more, for example. The width of the L gap is preferably about 30 μm or more, for example. The distance between the internal electrode layers in the same or substantially the same plane is preferably about 30 μm or more, for example.

While preferred embodiments of the capacitor component of the present invention have been described above, various modifications and changes may be made without departing from the scope and spirit of the present invention, for example, with respect to the structure and production conditions of the capacitor components, the configuration and layout of the internal electrode layers, and features of the external electrodes.

In the capacitor components according to preferred embodiments of the present invention, at least two capacitor elements are electrically connected in series. As described in the second preferred embodiment and the third preferred embodiment, including additional floating internal electrode layers as the third internal electrode layers that oppose each other is able to increase the number of capacitor elements that are connected in series.

In the above preferred embodiments, the grounding external electrodes as the third external electrodes are provided on both lateral surfaces of the laminate. However, the capacitor component of the present invention only requires that the third external electrode is provided on at least one of the lateral surfaces of the laminate.

Examples of the capacitor component of the present invention are described below. The present invention is not limited to these examples.

In the present example, a three-terminal multilayer ceramic capacitor described below was produced. The overall dimensions of the multilayer ceramic capacitor are as follows: about 1.6 mm in length, about 0.8 mm in width, and about 0.6 mm in thickness.

FIG. 12 is a set of LT cross-sectional views and LW cross-sectional views of laminates defining multilayer ceramic capacitors in Example 1, Example 2, Reference Example 1, and Comparative Example 1.

The multilayer ceramic capacitors in Example 1 and Example 2 correspond to the multilayer ceramic capacitor according to the first preferred embodiment of the present invention. The multilayer ceramic capacitor in Reference Example 1 corresponds to a multilayer ceramic capacitor disclosed in JP 2015-41735 A. The multilayer ceramic capacitor in Comparative Example 1 corresponds to a common three-terminal multilayer ceramic capacitor.

Internal electrode patterns shown in "LW cross section 1" and "LW cross section 2" in FIG. 12 were formed by screen printing with a Ni internal electrode paste on green sheets (ceramic substrates) mainly including barium titanate.

As shown in "LT cross section" in FIG. 12, multiple green sheets having the internal electrode patterns were stacked. A predetermined number of green sheets not having internal electrode patterns were also stacked with each patterned green sheet sandwiched therebetween. These green sheets were integrated by compression, and cut into individual chips, followed by firing. Thus, laminates were produced.

External electrode layers were formed on end surfaces and lateral surfaces of the fired laminate, and a multilayer ceramic capacitor was produced. The external electrodes were formed by applying and baking a Cu external electrode paste and then electroplating with Ni and Sn.

Figure 13:
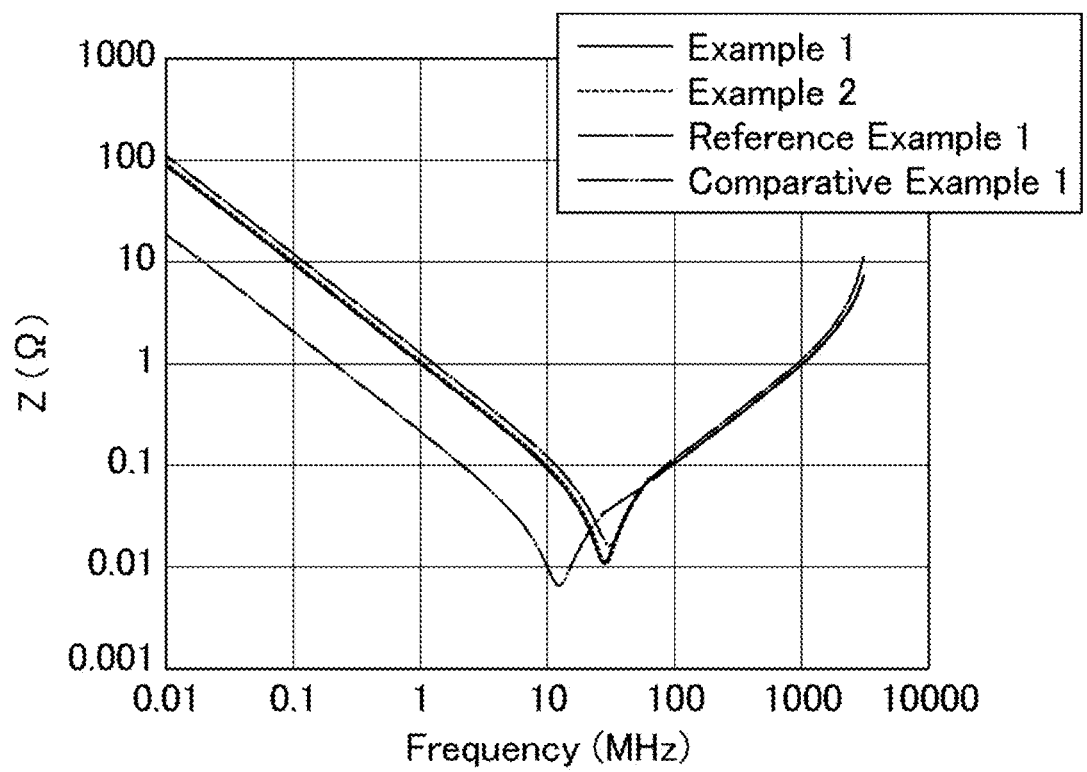
FIG. 13 is a graph of measured impedance results of the multilayer ceramic capacitors in Example 1, Example 2, Reference Example 1, and Comparative Example 1.
Figure 14:
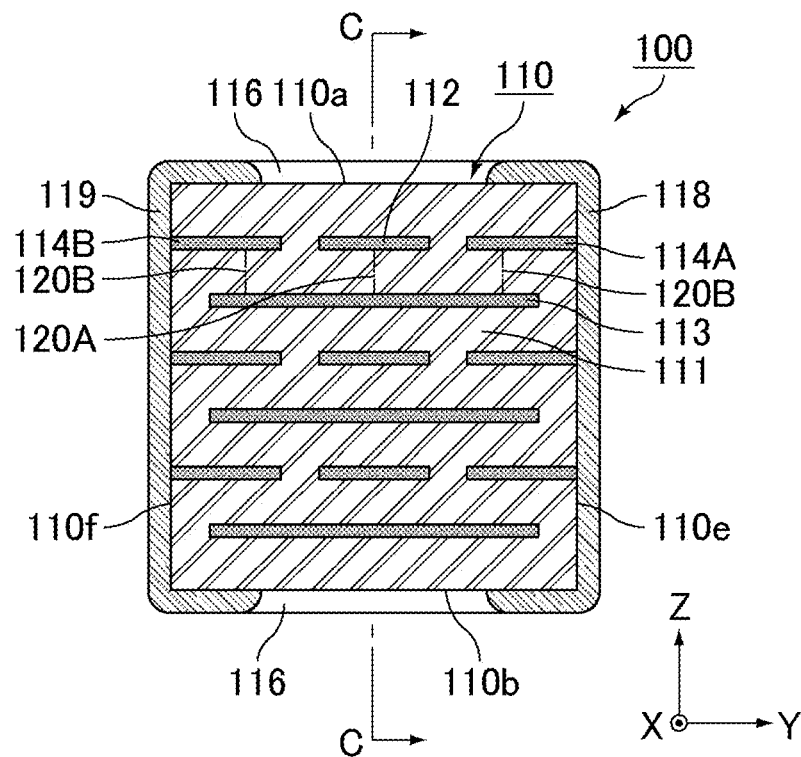
FIG. 14 is a WT cross-sectional view showing an example of a multilayer ceramic capacitor including a capacitor component disclosed in JP 2015-41735 A.
Figure 15:
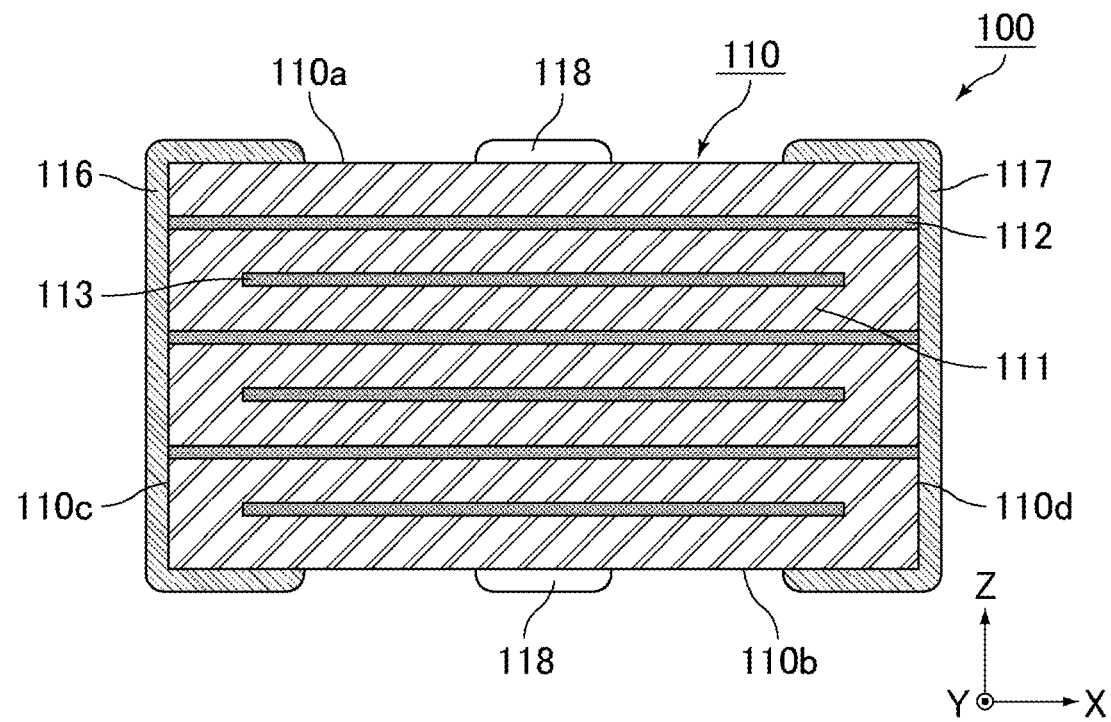
FIG. 15 is an LT cross-sectional view taken along line C-C of the multilayer ceramic capacitor shown in FIG. 14.
Figure 16A:
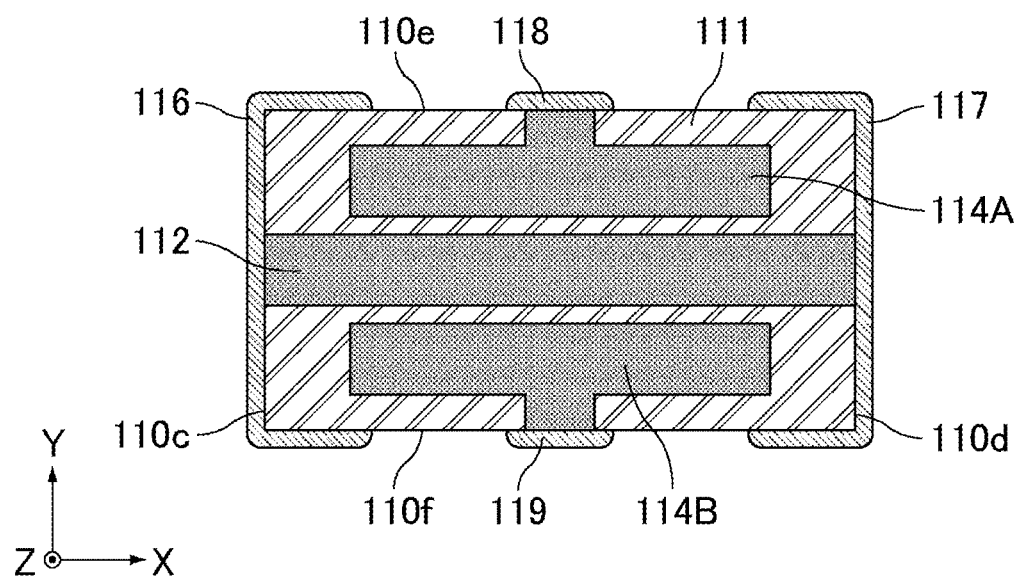
FIG. 16A is an LW cross-sectional view of a portion including a signal internal electrode layer and grounding internal electrode layers of the multilayer ceramic capacitor shown in FIG. 14 and FIG. 15.
Figure 16B:
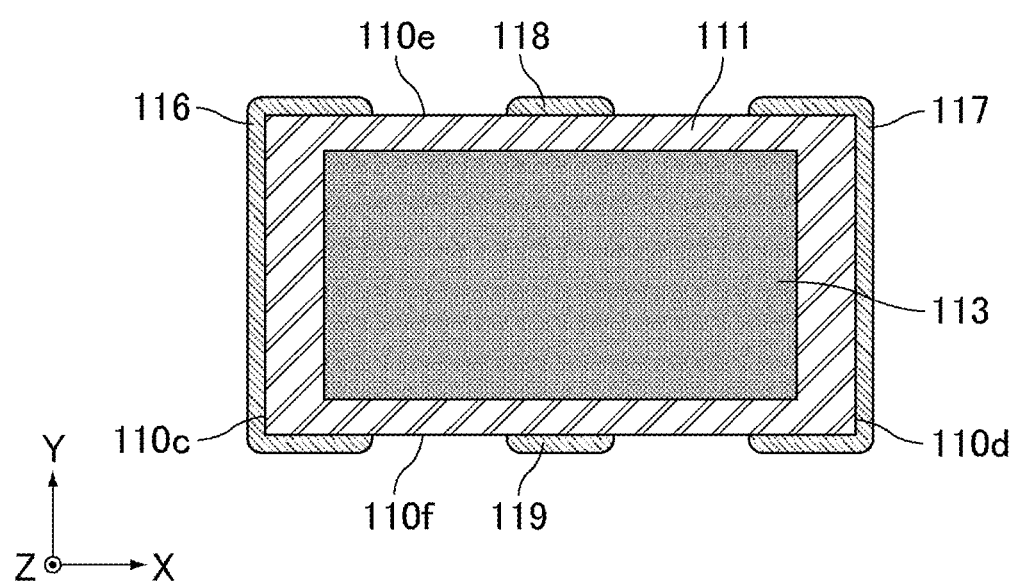
FIG. 16B is another LW cross-sectional view of a portion including a floating internal electrode layer of the multilayer ceramic capacitor shown in FIG. 14 and FIG. 15.

FIG. 13 is a graph of measured impedance results of the multilayer ceramic capacitors in Example 1, Example 2, Reference Example 1, and Comparative Example 1.

Conditions for impedance measurement were as follows.
Measurement device: network analyzer+probe station
Measurement probe: equivalent to ACP40-GSG-500
Measurement frequency: about 10 kHz to about 3 GHz
Measurement point: 401

As shown in FIG. 13, in each of the multilayer ceramic capacitors in Example 1, Example 2, and Reference Example 1, since the multiple capacitor elements were electrically connected in series, a capacitance was about ¼ of that in Comparative Example 1.

Meanwhile, all the multilayer ceramic capacitors had the same or similar characteristics in a frequency range higher than the self-resonant frequency that is influenced by ESL. This shows that the multilayer ceramic capacitors in Example 1, Example 2, and Reference Example 1 in which multiple capacitor elements were electrically connected in series had low ESL characteristics, as in the case of the common three-terminal multilayer ceramic capacitor in Comparative Example 1.

As described above, in each of the multilayer ceramic capacitors in Example 1, Example 2, and Reference Example 1, since the multiple capacitor elements are electrically connected in series, a higher reliability than that of Comparative Example 1 is provided. Further, the multilayer ceramic capacitor in Example 1 and Example 2 are advantageous than that in Reference Example 1 in that the capacitor elements connected in series are prevented from breaking simultaneously when warping cracking occurs at the ends of the external electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A capacitor component comprising:
   a laminate including dielectric layers and internal electrode layers alternately laminated in a first direction;
   a first external electrode and a second external electrode respectively provided on a first end surface and a second end surface of the laminate, the first and second end surfaces provided as a pair opposing each other in a second direction perpendicular or substantially perpendicular to the first direction; and
   a third external electrode provided on at least one of a first lateral surface and a second lateral surface of the laminate, the first and second lateral surfaces provided as a pair opposing each other in a third direction perpendicular or substantially perpendicular to the first direction and the second direction; wherein
   the internal electrode layers include:
     a first internal electrode layer connected to the first external electrode and not connected to either the second external electrode or the third external electrode;
     a second internal electrode layer connected to the second external electrode and not connected to either the first external electrode or the third external electrode;
     a third internal electrode layer not connected to any of the first external electrode, the second external electrode, or the third external electrode; and
     a fourth internal electrode layer connected to the third external electrode and not connected to either the first external electrode or the second external electrode;
   the first internal electrode layer or the second internal electrode layer opposes the third internal electrode layer in the first direction to define a first capacitor element;
   the third internal electrode layer opposes the fourth internal electrode layer in the first direction to define a second capacitor element;
   the first capacitor element and the second capacitor element are electrically connected in series among the first external electrode, the second external electrode, and the third external electrode; and
   a number of the internal electrode layers in a plane perpendicular or substantially perpendicular to the first direction in which the third internal electrode layer is located and the fourth internal electrode layer is not located, is different from a number of the internal electrode layers in a plane perpendicular or substantially perpendicular to the first direction in which the fourth internal electrode layer is located.

2. The capacitor component according to claim 1, wherein
   the first internal electrode layer, the second internal electrode layer, and the fourth internal electrode layer are located in a first plane perpendicular or substantially perpendicular to the first direction; and
   the third internal electrode layer is located in a second plane perpendicular or substantially perpendicular to the first direction.

3. The capacitor component according to claim 1, wherein
   the third internal electrode layer includes a pair of the third internal electrode layers;
   the third internal electrode layers in the pair oppose each other in the first direction to define a third capacitor element among the first internal electrode layer, the second internal electrode layer, and the fourth internal electrode layer; and
   the first capacitor element, the second capacitor element, and the third capacitor element are electrically connected in series among the first external electrode, the second external electrode, and the third external electrode.

4. The capacitor component according to claim 3, wherein
   the first internal electrode layer, the second internal electrode layer, and one of the third internal electrode layers in the pair are located in a first plane perpendicular or substantially perpendicular to the first direction; and
   the other of the third internal electrode layers in the pair and the fourth internal electrode layer are located in a second plane perpendicular or substantially perpendicular to the first direction.

5. The capacitor component according to claim 1, wherein
   the third internal electrode layer includes a first pair of the third internal electrode layers and a second pair of the third internal electrode layers;
   the third internal electrode layers in the first pair oppose each other in the first direction to define a third capacitor element, and the third internal electrode layers in the second pair oppose each other in the first direction to define a fourth capacitor element, among the first internal electrode layer, the second internal electrode layer, and the fourth internal electrode layer; and
   the first capacitor element, the second capacitor element, the third capacitor element, and the fourth capacitor element are electrically connected in series among the first external electrode, the second external electrode, and the third external electrode.

6. The capacitor component according to claim 5, wherein
   the first internal electrode layer, the second internal electrode layer, the fourth internal electrode layer, and one of the third internal electrode layers in the first pair or one of the third internal electrode layers in the second pair are located in a first plane perpendicular or substantially perpendicular to the first direction; and
   the other of the third internal electrode layers in the first pair or the other of the third internal electrode layers in the second pair is located in a second plane perpendicular or substantially perpendicular to the first direction.

7. The capacitor component according to claim 1, wherein the laminate has a dimension in the second direction that is larger than a dimension in the third direction.

8. The capacitor component according to claim 1, wherein the third external electrode is a grounding electrode.

9. The capacitor component according to claim 1, wherein the first external electrode and the second external electrode are electrically connected in series to a power line.

10. The capacitor component according to claim 1, wherein the laminate has a cuboid or a substantially cuboid shape.

11. The capacitor component according to claim 1, wherein
the first external electrode covers the first end surface, a portion of the first lateral surface, and a portion of the second lateral surface; and
the second external electrode covers the second end surface, a portion of the first lateral surface, and a portion of the second lateral surface.

12. The capacitor component according to claim 1, wherein the third external electrode covers a central portion of the at least one of the first and second lateral surfaces.

13. The capacitor component according to claim 1, wherein the third external electrode includes two electrodes that are spaced apart from each other.

14. The capacitor component according to claim 1, wherein each of the first external electrode, the second external electrode, and the third external electrode includes a conductive film with a sintered metal layer and a plated layer.

15. The capacitor component according to claim 1, wherein each of the first external electrode, the second external electrode, and the third external electrode includes a conductive resin paste.

16. The capacitor component according to claim 1, wherein the dielectric layers include a ceramic material, and the internal electrode layers include a metal material.

17. The capacitor component according to claim 1, wherein
the first and second internal electrode layers are signal electrode layers;
the third internal electrode layer is a floating electrode layer; and
the fourth internal electrode layer is a grounding electrode layer.

* * * * *